(12) United States Patent
Kettler et al.

(10) Patent No.: US 11,741,460 B2
(45) Date of Patent: *Aug. 29, 2023

(54) SYSTEMS AND METHODS FOR OPTIMIZED ROUTING OF ELECTRONIC TRANSACTIONS ACROSS MULTIPLE ACQUIRER PROCESSORS

(71) Applicant: Worldpay, LLC, Symmes Township, OH (US)

(72) Inventors: Dennis Kettler, Mason, OH (US); Ryan Clapp, Loveland, OH (US)

(73) Assignee: Worldpay, LLC, Symmes Township, OH (US)

( * ) Notice: Subject to any disclaimer, the term of this patent is extended or adjusted under 35 U.S.C. 154(b) by 48 days.

This patent is subject to a terminal disclaimer.

(21) Appl. No.: 17/650,916

(22) Filed: Feb. 14, 2022

(65) Prior Publication Data

US 2022/0164792 A1 May 26, 2022

Related U.S. Application Data

(63) Continuation of application No. 15/839,239, filed on Dec. 12, 2017, now Pat. No. 11,282,075.

(51) Int. Cl.
*G06Q 20/38* (2012.01)
*G06Q 20/08* (2012.01)
(Continued)

(52) U.S. Cl.
CPC ......... *G06Q 20/3825* (2013.01); *G06Q 20/06* (2013.01); *G06Q 20/085* (2013.01); *G06Q 20/26* (2013.01); *G06Q 20/40* (2013.01)

(58) Field of Classification Search
None
See application file for complete search history.

(56) References Cited

U.S. PATENT DOCUMENTS

2007/0233597 A1* 10/2007 Petersen ................ G06Q 40/00
705/39
2009/0070246 A1* 3/2009 Tieken ................. G06Q 20/405
705/35

(Continued)

FOREIGN PATENT DOCUMENTS

WO    WO-0178024 A2 * 10/2001 ............. G06Q 20/02

OTHER PUBLICATIONS

John D Stevens, "Durbin + Debit: The Devil\'s in the Details", 2011, Slideshare.net, https://www.slideshare.net/JohnDStevens/durbin-debit-the-devils-in-the-details (Year: 2011).*

*Primary Examiner* — Ryan D Donlon
*Assistant Examiner* — Mark A Malkowski
(74) *Attorney, Agent, or Firm* — Bookoff McAndrews, PLLC

(57) ABSTRACT

A method for routing electronic payment transactions may include receiving transaction-related information from a merchant, extracting transaction routing criteria from the received transaction-related information, identifying one or more eligible payment networks and one or more eligible acquirer processors based on extracted transaction routing criteria, predicting a likelihood of authorization acceptance for each combination of identified acquirer processor and identified network, identifying one or more breakeven transaction amounts for each combination of identified eligible acquirer processor and identified eligible payment network, and routing signature debit transactions from the merchant to a least cost combination of acquirer processor and PIN-less debit network selected from the eligible payment networks based on identification of a desired breakeven transaction amount for the PIN-less debit network.

20 Claims, 12 Drawing Sheets

(51) Int. Cl.
  *G06Q 20/06* (2012.01)
  *G06Q 20/40* (2012.01)
  *G06Q 20/26* (2012.01)

(56) References Cited

U.S. PATENT DOCUMENTS

| | | | |
|---|---|---|---|
| 2009/0327124 A1* | 12/2009 | McElroy | G06Q 20/10 |
| | | | 705/39 |
| 2011/0106695 A1* | 5/2011 | Fernandez | G06Q 20/10 |
| | | | 235/380 |
| 2012/0265680 A1* | 10/2012 | Lynch | G06Q 20/00 |
| | | | 705/44 |
| 2012/0271765 A1* | 10/2012 | Cervenka | G06Q 20/12 |
| | | | 705/44 |
| 2013/0054465 A1* | 2/2013 | Sakata | G06Q 40/02 |
| | | | 705/44 |
| 2013/0311375 A1* | 11/2013 | Priebatsch | G06Q 30/06 |
| | | | 705/44 |
| 2014/0040114 A1 | 2/2014 | Baumgart et al. | |
| 2014/0214651 A1* | 7/2014 | Prasadh | G06Q 20/12 |
| | | | 705/39 |
| 2016/0300214 A1 | 10/2016 | Chaffin et al. | |
| 2017/0004481 A1* | 1/2017 | Slusser | G06Q 20/12 |
| 2017/0243207 A1* | 8/2017 | Lorberg | G06Q 20/40 |
| 2017/0300879 A1* | 10/2017 | Subramanian | G06Q 20/34 |

* cited by examiner

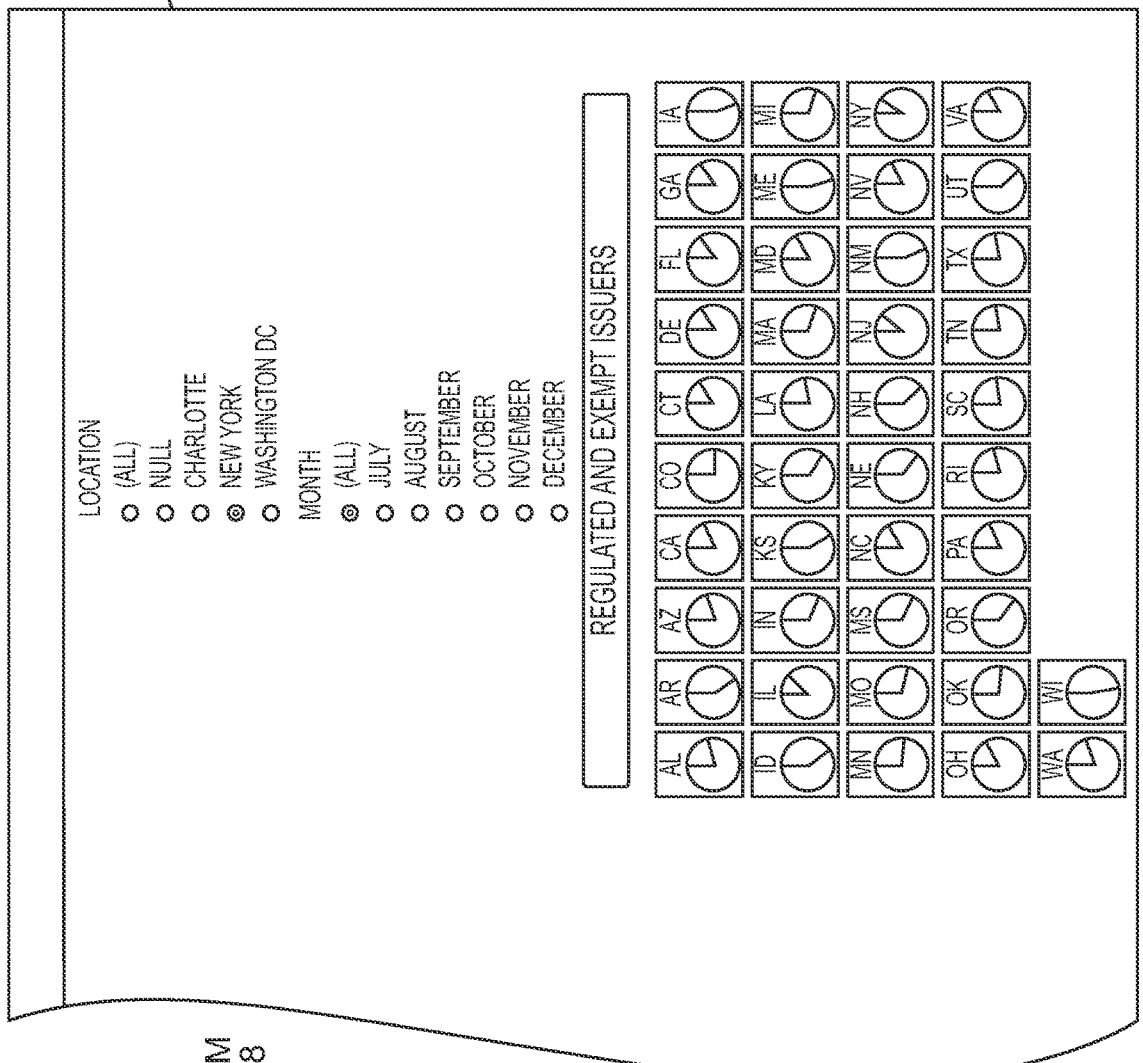

SYSTEMS AND METHODS FOR OPTIMIZED ROUTING OF ELECTRONIC TRANSACTIONS ACROSS MULTIPLE ACQUIRER PROCESSORS

CROSS-REFERENCE TO RELATED APPLICATION(S)

This patent application is a continuation of and claims the benefit of priority to U.S. application Ser. No. 15/839,239, filed on Dec. 12, 2017, the entirety of which is incorporated herein by reference.

TECHNICAL FIELD

Various embodiments of the present disclosure relate generally to the field of routing electronic payment transactions and, more particularly, to routing electronic payment transactions using payment pseudo-networks and electronic transaction simulation based on predicted authorization approval and forecasting across multiple acquirer processors.

BACKGROUND

In the world of payments, merchants, such as retailers and e-commerce sites, may choose various acquiring institutions or banks ("acquirers") to process payment transactions through the various payment networks used by consumers. The payment networks may include credit networks (e.g., Visa, Master Card, Discover, American Express, etc.) and/or debit networks (e.g., Star, Plus, Jeanie, Pulse, etc.). Consumer card issuers may decide which groups and types of networks to accept, and merchants may further determine which processors and networks to route transactions through.

Payment networks, in turn, may use a number of factors to determine the interchange category and/or interchange rate for a given transaction. Some of these factors may be controlled or influenced by the merchant, the factors including but not limited to, the processing method (e.g., card present and card-not-present), the Merchant Category Code (MCC), and transaction data. However, payment networks may also use factors that may be outside of the control of a merchant to determine the interchange category and/or interchange rate for a given transaction. These factors, which a merchant may not be able to control or influence include, but are not limited to, the card type (separate interchange categories exist for credit and debit as well as corporate cards, prepaid cards, etc.), the card brand (Visa, MasterCard, etc.), and/or the card owner (whether a credit or debit card is issued by a small credit union, regional bank or large National bank).

If a merchant has a large volume of transactions, then the savings from paying the lowest transaction fees could easily add up to hundreds of thousands of dollars per month. The ability to route transactions least cost is further complicated by cases where a merchant has multiple locations and/or multiple business lines per location in the case of multi-format retailer, such as a "big box store" (ex: photography section, salon section, vision section, electronics section, apparel section, etc., wherein each section may have its own MCC).

Furthermore, analyzing transaction costs and making routing decisions may be complicated by both (i) mandatory state and Federal regulatory rules and (ii) voluntary agreements among issuers, networks, and processors, any of which may pertain to negotiated transaction volume/amount thresholds, negotiated markup rates, exemption from regulations, and preferences. As an example, under the "Durbin amendment" of the Dodd-Frank financial reform legislation of 2010, financial institutions having over $10B in assets may be considered "regulated," whereas financial institutions having less than $10B in assets may be "exempt." Moreover, many Debit Networks (e.g. Star, Jeanie, etc.) create "preferred rates" that may be different from "standard rates," and these rates may change from merchant to merchant, and/or from issuer to issuer. As a result, when compiling a "rate sheet," it can be important to know which merchants or issuers are preferred, and what the preferred rates are. Many networks also charge not only based on "standard' vs. "preferred," but also regulated vs. exempt, and based on card type (prepaid, business, etc.) and transaction volumes/amounts over time.

In addition, a failure to authorize a transaction may require a resubmission of the transaction and an increase in transaction costs associated with the resubmission. Accordingly, an undetermined probability that a transaction will be declined may further complicate the estimation of transaction costs across multiple networks.

Furthermore, these analyses may yield different conclusions when applied to different acquirer processors available to process a given transaction.

Thus, while a static table of networks or issuers might provide some initial insights into costs, the real costs may depend on regulatory status and/or whether certain regulatory or contractual thresholds (maximums or minimums) have been reached in some given time period. Since actual costs or rates may depend on total numbers of transactions and a likelihood that a transaction will be declined, it can be difficult to predict the real costs and/or the ideal routing for any given transaction.

Thus, there is a desire for a system and method for allowing merchants to automatically find the most desired networks through which to route electronic payment transactions, on a dynamic and granular level.

The present disclosure is directed to overcoming one or more of these above-referenced challenges.

SUMMARY OF THE DISCLOSURE

According to certain aspects of the present disclosure, systems and methods are disclosed for optimized routing of electronic transactions across multiple acquirer processors.

In one embodiment, a computer-implemented method is disclosed for optimized routing of electronic transactions across multiple acquirer processors, the method comprising: receiving transaction-related information from a merchant, the transaction-related information including a bank identification number ("BIN"), one or more available payment network IDs, one or more merchant categories, an issuer regulatory status, a transaction amount, and a preferred status, extracting transaction routing criteria from the received transaction-related information, dynamically identifying one or more eligible payment networks based on extracted transaction routing criteria, dynamically identifying one or more eligible acquirer processors based on extracted transaction routing criteria, predicting a likelihood of authorization acceptance for each combination of identified acquirer processor and identified network based on the transaction-related information, dynamically identifying one or more breakeven transaction amounts for each combination of identified eligible acquirer processor and identified eligible payment network, each breakeven transaction amount defining a point at which two or more combinations of eligible acquirer processors and eligible payment networks have the same expenses for a given transaction amount, the expenses including costs associated with a low predicted likelihood of authorization acceptance, and routing signature debit transactions from the merchant to a least cost combination of acquirer processor and PIN-less debit network selected from the eligible payment networks based on identification of a desired breakeven transaction amount for the PIN-less debit network.

In accordance with another embodiment, a system is disclosed for optimized routing of electronic transactions across multiple acquirer processors, the system comprising: a data storage device storing instructions for routing electronic payment transactions to PIN-less networks using payment pseudo-networks and electronic transaction simulation in an electronic storage medium; and a processor configured to execute the instructions to perform a method including: receiving transaction-related information from a merchant, the transaction-related information including a bank identification number ("BIN"), one or more available payment network IDs, one or more merchant categories, an issuer regulatory status, a transaction amount, and a preferred status, extracting transaction routing criteria from the received transaction-related information, dynamically identifying one or more eligible payment networks based on extracted transaction routing criteria, dynamically identifying one or more eligible acquirer processors based on extracted transaction routing criteria, predicting a likelihood of authorization acceptance for each combination of identified acquirer processor and identified network based on the transaction-related information, dynamically identifying one or more breakeven transaction amounts for each combination of identified eligible acquirer processor and identified eligible payment network, each breakeven transaction amount defining a point at which two or more combinations of eligible acquirer processors and eligible payment networks have the same expenses for a given transaction amount, the expenses including costs associated with a low predicted likelihood of authorization acceptance, and routing signature debit transactions from the merchant to a least cost combination of acquirer processor and PIN-less debit network selected from the eligible payment networks based on identification of a desired breakeven transaction amount for the PIN-less debit network.

In accordance with another embodiment, a non-transitory machine-readable medium storing instructions that, when executed by the a computing system, causes the computing system to perform a method for optimized routing of electronic transactions across multiple acquirer processors, the method including: receiving transaction-related information from a merchant, the transaction-related information including a bank identification number ("BIN"), one or more available payment network IDs, one or more merchant categories, an issuer regulatory status, a transaction amount, and a preferred status, extracting transaction routing criteria from the received transaction-related information, dynamically identifying one or more eligible payment networks based on extracted transaction routing criteria, dynamically identifying one or more eligible acquirer processors based on extracted transaction routing criteria, predicting a likelihood of authorization acceptance for each combination of identified acquirer processor and identified network based on the transaction-related information, dynamically identifying one or more breakeven transaction amounts for each combination of identified eligible acquirer processor and identified eligible payment network, each breakeven transaction amount defining a point at which two or more combinations of eligible acquirer processors and eligible payment networks have the same expenses for a given transaction amount, the expenses including costs associated with a low predicted likelihood of authorization acceptance, and routing signature debit transactions from the merchant to a least cost combination of acquirer processor and PIN-less debit network selected from the eligible payment networks based on identification of a desired breakeven transaction amount for the PIN-less debit network.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims. As will be apparent from the embodiments below, an advantage to the disclosed systems and methods is that multiple parties may fully utilize their data without allowing others to have direct access to raw data. The disclosed systems and methods discussed below may allow advertisers to understand users' online behaviors through the indirect use of raw data and may maintain privacy of the users and the data.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIGS. 8 and 8B are screenshots of an exemplary graphical user interface (GUI) depicting routing and settlement results for an exemplary merchant.

DETAILED DESCRIPTION OF EMBODIMENTS

Figure 1:
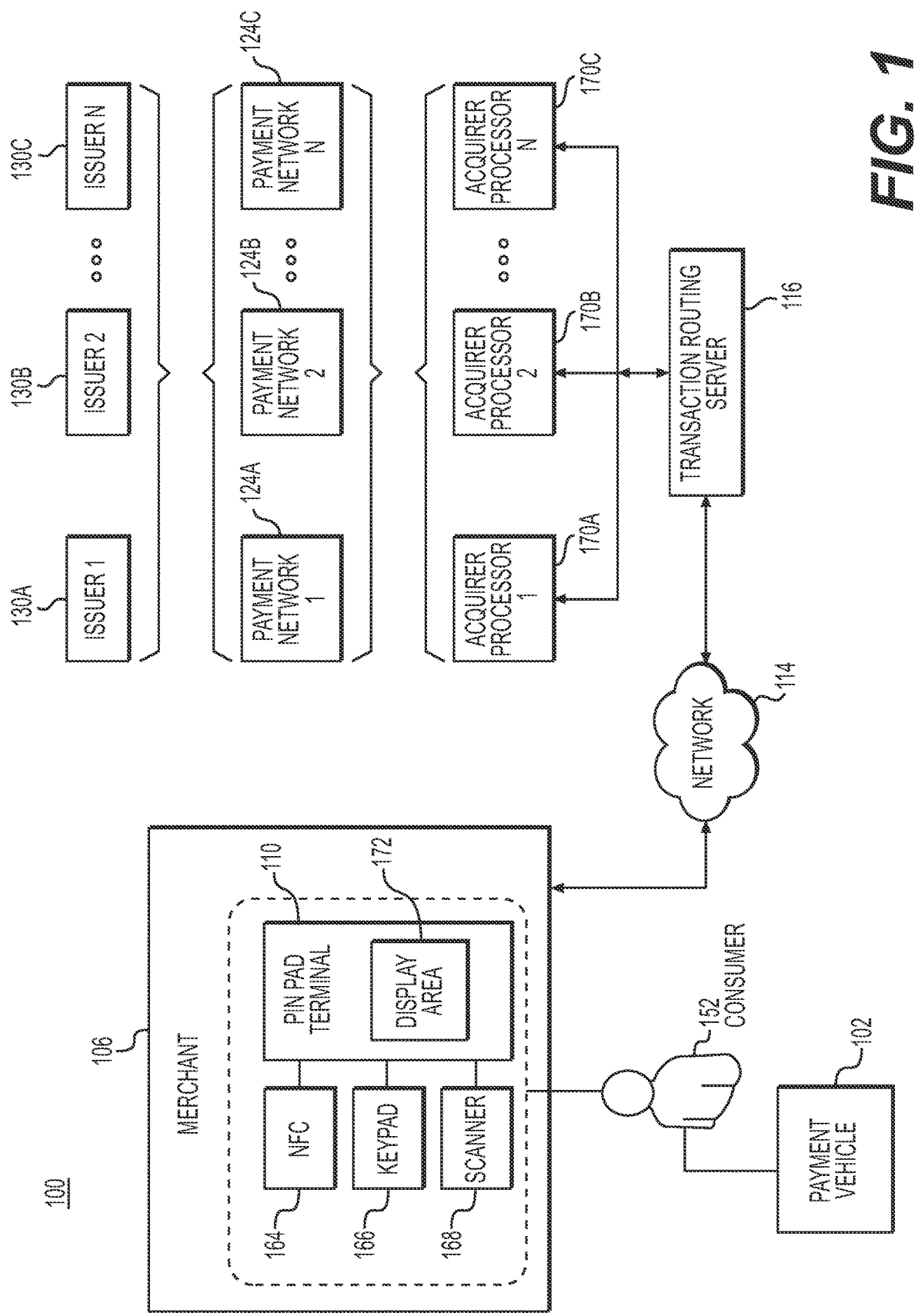
FIG. 1 depicts a block diagram of an example environment and systems for routing electronic payment transactions, in accordance with non-limiting embodiments.

Various non-limiting embodiments of the present disclosure will now be described to provide an overall understanding of the principles of the structure, function, and use of systems and methods disclosed herein for optimized routing of electronic transactions across multiple acquirer processors.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

As described above, in some cases, analyzing transaction costs and making routing decisions may be complicated by (i) mandatory regulatory rules, (ii) voluntary agreements among issuers, networks, and processors, any of which may pertain to transaction volume, markup rates, exemption from regulations, and preferences, and (iii) a probability that a transaction will be declined. As an example, financial institutions having over $10B in assets may be considered "regulated" under Durbin, whereas financial institutions having less than $10B in assets may be "exempt." Moreover, many processors create "preferred rates" that may be different from "standard rates," and these rates may change from merchant to merchant, and/or from issuer to issuer. As a result, when compiling a "rate sheet," it can be important to know which merchants or issuers are preferred, and what the preferred rates are. Many networks also change not only based on "standard' vs. "preferred," but also regulated vs. exempt, and based on card type (prepaid, business, etc.).

Thus, while a static table of networks or issuers might provide some initial insights into costs, the real costs may depend on regulatory status and/or whether certain regulatory or contractual thresholds (maximums or minimums) have been reached in some given time period. Since actual costs or rates may depend on total numbers of transactions, it can be difficult to predict the real costs and/or the ideal routing for any given transaction.

In addition, a failure to authorize a transaction may require a resubmission of the transaction and an increase in transaction costs associated with the resubmission. Accordingly, an undetermined probability that a transaction will be declined may further complicate the estimation of transaction costs across multiple networks.

Furthermore, these analyses may yield different conclusions when applied to different acquirer processors available to process a given transaction.

In view of the foregoing, the present disclosure describes embodiments of a transaction routing server configured to generate "pseudo-networks" designed to be compared against networks when performing decisioning within a rate sheet of networks. "Pseudo-networks" may be artificial networks or modified versions of networks and configured to simulate routing options within the payments environment. Specifically, the disclosed embodiments involve generating pseudo-networks mimicking actual payment networks, and generating and updating routing tables reflecting forecasted routing transaction costs to ensure desired transaction volumes are being achieved while minimizing acceptance costs. The present disclosure also describes embodiments of a transaction routing server configured to perform simulation and forecasting of transaction routing. For example, the disclosed embodiments also involve simulating and forecasting transactions for the purpose of comparing data against historical data, and forecasting volume against negotiated thresholds.

Thus, the present disclosure is directed to a proprietary, comprehensive solution for optimized routing of electronic transactions across multiple acquirer processors. Moreover, the embodiments of the present disclosure enhance transaction routing intelligence and reduce the cost of acceptance.

As will be described in more detail below, the presently disclosed systems and methods may route and optimize transactions according to one or more of the following factors: a determined probability that a transaction will be declined, merchant category code (MCC), regulatory (e.g., Durbin) qualification, transaction amount, full acceptance cost (e.g., I/C, switch, other, etc.), identification of standard/premier issuer status, identification of business vs. prepaid cards, BIN/network identification, and/or interchange monitoring/forecasting.

Furthermore, the presently disclosed systems and methods may route and optimize transactions to an eligible acquirer processer based on a number of factors including, for example, debit network eligibility/availability, PIN-less authorization approval likelihood, authorization approval lift, cost of acquisition, cost of processing (i.e., core processing fees).

The disclosed embodiments are relevant to any type of credit and/or debit transactions, including both PIN and PIN-less, and are designed to reduce expenses while also optimizing across various dimensions according to various desires. As disclosed herein, the present techniques also include electronic displays for purposes of real-time reporting, monthly reporting, annual reporting, and the like, for reflecting to clients the savings resulting from the presently disclosed routing techniques. The disclosed routing techniques also involve "PIN prompting," which reduces acceptance costs by steering consumers away from signature transactions to PIN debit transactions, and seamlessly routing signature debit transactions to least-cost PIN-less debit networks.

As described above, the present disclosure is directed to both PIN and PIN-less transactions that reach a processor upon swiping, dipping, EMV, etc. initiation of a payment transaction. It should be appreciated that a payment processor may route each transaction to any of a number of different networks including Interlink (VISA), Maestro (MC), Pulse (Disc), Star (First Data), Accel, etc. In many cases, as a transaction is received, the processor may receive the primary account number ("PAN"), time/date stamp, amount, MCC, and determine the issuer by analyzing the received PAN and determined which network or networks are enabled by the given issuer (e.g., a given issuer may have enabled, e.g., Interlink, Star, and Accel). According to the embodiments of the present disclosure, additional routing analysis and decisioning may be performed to determine, in real-time, the actual cost of a given transaction, based on one or more factors or criteria. For example, a transaction routing server consistent with the disclosed embodiments may receive transactions and extract routing criteria comprising, category code, ticket amount, and so on. A transaction routing server consistent with the disclosed embodiments may further determine a probability that a transaction will be declined when presented to one or more network or networks based on the parameters of the transaction.

The cost of fees charged by acquirers and networks for payment transactions may impose significant costs on merchants, especially for large volumes of transactions. It may also be burdensome or otherwise impossible, to date, for a merchant, to sign up for and, at every payment transaction, search for, the least cost acquirer, network, and/or pricing model, or be able to manage the communication of transaction information between payment terminals, acquirer processors, and networks, especially when there are different messaging formats used by the payment terminals or networks.

Thus, the embodiments of the present disclosure are also directed to methods and systems to identify and achieve the lowest cost for each purchase transaction initiated by a merchant through the creation of a marketplace model. The marketplace model may include a computing system, which may include a "transaction routing server" that selects, from among a marketplace of networks, a network that provides the "least cost" (e.g., lowest cost) acceptance or mark-up rate. Furthermore, various embodiments of the present disclosure describe systems and methods for enabling the transaction routing server to communicate and network efficiently between various payment terminals, a plurality of acquirer processors, and a plurality of networks.

One or more examples of these non-limiting embodiments are illustrated in the selected examples disclosed and described in detail with reference made to the figures in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

FIG. 1 depicts a block diagram of an example environment and systems for routing electronic payment transactions, in accordance with non-limiting embodiments. As shown in FIG. 1, in a typical scenario, a merchant environment 100 for processing consumer payment transactions, according to one or more embodiments, may include a merchant 106, acquirer processors 170A-170C, financial institutions 130A-130B, and first consumer 152, which may be provided in communication with each other via a computer network 114 and payment networks 124A-124C. The components of the payments processing network may be connected by any combination of wired or wireless networks, for example, PSTNs and/or the Internet. Acquirer processors 170A-170C (e.g., acquiring bank) may be in partnership with payment networks 124A-124C, such that an acquirer processor 170 may process payments through, and on behalf of, a payment network 124. Payment network 124 may in turn have a partnership with a financial institution 130 (e.g., issuing bank). Financial institution 130 may hold accounts for one or more consumers 152. Consumer 152 may have a payment vehicle 102 (e.g., credit card, debit card, stored value card, etc.) which may be affiliated with payment network 124. Consumer 152 may be able to use their payment vehicle 102 to make purchases with merchant 106.

Acquirer processor 170 may be an entity that provides a variety of electronic payment processing services to merchant 106. For example, acquirer processor 170 may be an entity that receives payment information from a transaction that occurs at a pin pad terminal 110 of merchant 106. The payment information may be, for example, payment card information encoded in the magnetic stripe or EMV chip of payment vehicle 102 and a payment amount of a transaction being made by, for example, consumer 152 with merchant 106 using the payment card account associated with payment vehicle 102. Acquirer processor 170 may process the information, and may send the information to the consumer's respective financial institution 130 via an appropriate payment network 124 depending on the particulars of payment vehicle 102. Processing the information may include, for example, determining the identity of payment network 124 and financial institution 130 associated with the particular payment vehicle 102.

Acquirer processor 170 may also receive information from payment network 124, such as confirmation or rejection of an attempted transaction using payment vehicle 102, and may convey that information to the appropriate POS terminal. Moreover, acquirer processor 170 may provide security and/or encryption services to merchant 106 and payment network 124, such that payments processed at pin pad terminal 110 may be completed with a decreased risk of data or financial theft or loss. Acquirer processor 170 may be located, for example, at a remote location from merchant 106 that uses its services, and may, for example, interact with merchant 106 primarily over an electronic network, such as a data network or the Internet.

Payment network 124 may be, for example, a network that relays debit and/or credit transactions to and from various accounts at financial institution 130. For example, payment network 124 may have a partnership program with financial institution 130 through which financial institution 130 may provide a payment vehicle account to consumer 152 associated with payment network 124. Payment network 124 may also be partnered with acquirer processor 170, which may manage payment transactions associated with payment network 124. Examples of payment network brands include, e.g., Visa, MasterCard, Discover, and American Express. While a single payment network 124 is illustrated, it is to be appreciated that multiple payment networks may be partnered with a single or multiple acquirer processors.

Financial institution 130 may be a bank that manages payment accounts associated with one or more payment networks 124 on behalf of one or more consumers 152. For example, financial institution 130 may allow for consumer 152 to build up a revolving credit balance at financial institution 130 and may periodically receive payments from consumer 152 to pay down the balance. Consumer 152 may be an individual, a company, or other entity having accounts with one or more financial institutions 130. Each consumer 152 may generally have at least one payment vehicle 102 associated with each payment account held by that consumer. Each consumer 152 may have multiple accounts with multiple financial institutions 130, which may be affiliated with the same or different payment networks 124.

Merchant 106 may be a merchant offering goods and/or services for sale to consumer 152 who have contracted with acquirer processor 170. Merchant 106 may be equipped with POS device, which is configured to receive payment information from payment vehicle 102 and to relay received payment information to acquirer processor 170. Merchant 106 can be any type of merchant, such as a brick-and-mortar retail location or an e-commerce/web-based merchant with a POS device or a web payment interface.

In FIG. 1, consumer 152 is shown to be associated with a payment vehicle 102. As is to be appreciated, payment vehicle 102 can include any type of payment vehicle that can be utilized to initiate a payment transaction. Unless otherwise specified herein, "payment vehicle" includes a virtual card, such as a display or screenshot for a mobile phone or for another portable device (e.g., a flash drive, smart chip, a laptop or portable computer), or for a computer device (e.g., a desktop computer) in combination with data indicative of an account number or other account indicative information. Data associated with the cards may include an encrypted or unencrypted account number or other encrypted or unencrypted account indicative information and/or encrypted or unencrypted information associated with a particular card, issuer, creator, or group of merchants. It is also contemplated that the card may have multiple embodiments or forms. For example, the card may be a physical card (e.g., in the form of a magnetic striped plastic card), a virtual card (e.g., in the form of a display on a smart phone), or both. In embodiments in which the card is a virtual card, the corresponding account information (e.g., account number) would initially be provided to the consumer and the consumer would communicate the account information to the merchant. The virtual card may be communicated by displaying a display or screenshot, and/or by transmitting a signal, such as by using a near field communication (NFC) technology, or other secure transport technologies to complete the transaction with the selected merchant. NFC is a short range, high frequency, wireless communication technology that enables the exchange of data between devices over a relatively short distance. Optionally, the virtual card may have a display element (e.g., a barcode or string of numbers) which identifies the account number associated with the card. Alternatively, the virtual card may have display elements relating to the merchants that accept the card. Thus, whether the card is physical or virtual, the card may communicate account information.

A POS device of merchant 106 may provide transaction information to the payment network 124 using any desired payment transaction communications. When consumer 152 checks-out, or pays for the goods or services, the identifying indicia of consumer 152 may be used for authentication. In one or more embodiments, pin pad terminal 110 may include an NFC system 164. NFC system 164 may communicate wirelessly with payment vehicle 102 of consumer 152, for example to obtain an authorization code or identifying information of consumer 152 or of payment vehicle 102. In one or more embodiments, pin pad terminal 110 may include a keypad 166. Consumer 152 may enter a personal identification number on keypad 166 for making a payment. Other numbers or alphanumeric characters, such as temporary passwords or authorization codes, are also contemplated as would be understood by one of ordinary skill in the art. In one or more embodiments, pin pad terminal 110 may include a scanner 168. Consumer 152 may display a code, such as, for example, a barcode or quick response (QR) code, etc., on the display of their mobile computing device to provide identifying indicia of consumer 152. Scanner 168 may be, for example, a handheld scanner, an embedded scanner such as is used to scan items at grocery stores, a camera, and so forth as would be understood by one of ordinary skill in the art.

Pin pad terminal 110 may include a display area 172. In one or more embodiments the display area 172 may be, for example, a window, a widget, or a pop-up, a webpage, and so forth, and be rectangular or nonrectangular, and occupy one or multiple contiguous or non-contiguous areas of pin pad terminal 110.

Pin pad terminal 110 may generate a payment request for payment by merchant 106. The payment request may include information such as, for example, information identifying the merchant to acquirer processor 170 or the party of payment network 124, the payment amount, which can include a gratuity, identifying indicia for consumer 152, authentication information such as whether the consumer was authenticated by merchant 106 using images of consumer 152, and/or authentication information such as personal identification number entered on keypad 166 by the consumer, a code scanned by scanner 168, or information about consumer 152 or payment vehicle received via NFC handshake or any other suitable authentication information.

Figure 2:
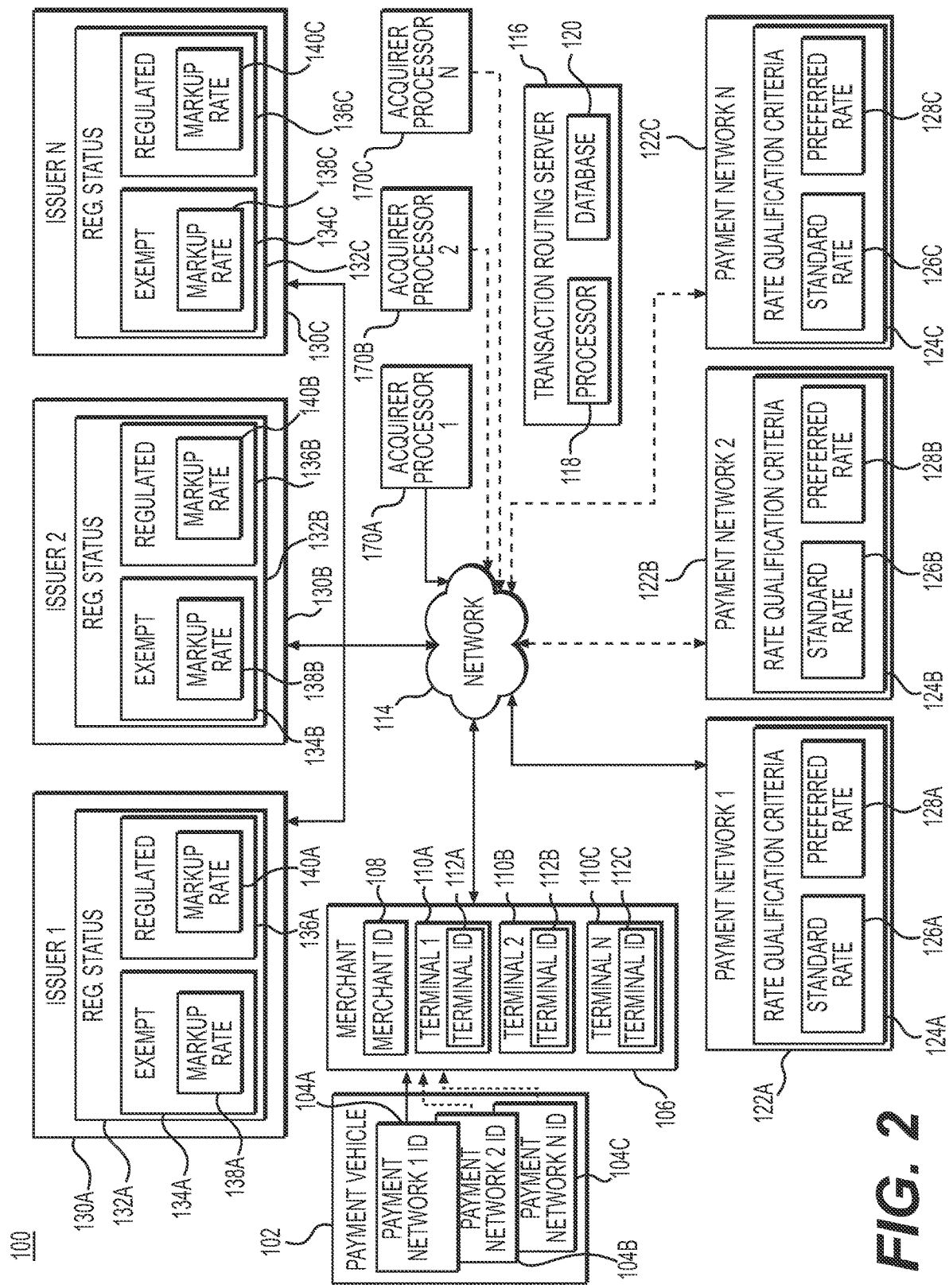
FIG. 2 depicts a block diagram of an example environment and systems for routing electronic payment transactions, in accordance with non-limiting embodiments.

FIG. 2 depicts a block diagram of an example environment and systems for routing electronic payment transactions to PIN-less debit networks and dynamically routing electronic payment transactions using payment pseudo-networks and electronic transaction simulation. It should be appreciated that the embodiments of the present disclosure, including FIG. 2, are also applicable to PIN debit and credit networks. At a high level, the transaction routing environment and systems ("system") 100 comprises: a payment vehicle 102 being used at a merchant 106 via a terminal 110A-C; a computing system ("transaction routing server" 116) that selects from among a marketplace of acquirer processors 170A-170C; payment networks 122A-122C; a plurality of issuers 130A-130C; and a network 114 (e.g., the wired or wireless Internet, LAN, and/or PSTN) that may enable communication between the various systems and entities. In some embodiments, certain rate qualification criteria 124A-124C, as determined by various payment networks 122A-122C may be used to map an appropriate regulatory status 132A-132C of an issuer 130A-130C to standard rates 126A-126C vs. preferred rates 128A-128C for a given issuer or merchant.

Still referring to FIG. 2, the payment vehicle 102 may be a tangible object (e.g., a credit card, debit card, gift card, etc.), an electronic device (e.g., in the case of ApplePay, Samsung Pay, Bitcoin, or the like), and/or an intangible representation of a user's payment source that may be used to initiate a payment transaction at a payment terminal 110A-110C of a merchant 106 by delivering information regarding the consumer's payment source (e.g., payment network 1 ID 104A, payment network 2 ID 104B, . . . payment network N ID 104C, etc.). It is also contemplated that for some merchants (e.g., e-commerce merchants), there may not be a physical terminal. In such embodiments, a merchant's server may serve as a terminal and the server may or may not have and/or send a terminal identifier. The payment vehicle may carry information of a payment network (e.g., Visa, MasterCard, Discover, American Express, JCB, etc., for credit networks, and/or Star, Plus, Jeanie, Cirrus, etc., for debit networks) using a payment network identification 104A-104C. The payment network identification may include one or more of a payment card number, an issuer identification number, a primary account number (PAN), a bank card number, and/or a bank identifier code of a payment source account. A consumer may initiate a payment transaction at a terminal, for example, by swiping a card and/or otherwise facilitating the transmission of payment network identification (e.g., electronically, verbally, etc.).

Still referring to FIG. 2, a merchant 106 may refer generally to any type of retailer, service provider, or any other type of business that is in networked communication with one or more issuers (e.g., Issuer 1 130A, Issuer 2 130B, . . . Issuer N 130C, etc.) and may use the payment processing services of the respective, acquirers, issuers, and/or unaffiliated processors/networks. Payment processing services may include receiving and responding to authorization requests as well as facilitating the settlement of funds associated with card-based transactions occurring at merchant 106. One or more terminals (e.g., Terminal 1 110A, Terminal 2 110B, . . . Terminal N 110C, etc.) may be mapped to merchant 106. As is known in the art, each terminal 110A-110C may be generally unmodified or "stock" and simply facilitate the standard transmission of transaction-related information to the computing system of an acquirer 130A-130C. In various embodiments of the present disclosure, the transaction routing server 116 may act or be perceived by the terminals as either an issuer or an acquirer processor computer system. Thus, each terminal 110A-C may facilitate the transmission of transaction-related information to the transaction routing server 116. The transaction-related information may comprise a transaction authorization request ("authorization request"), including but not limited to, a payment amount, a date, a time, a payment network identification (e.g., a primary account number and/or issuer identification number) as well as other types of identifying indicia (e.g., merchant identification 108, terminal identification 112A-C, etc.). The identifying indicia may vary based on the terminal 112A-C, the type of merchant 106, or the payment network being used at the terminal.

Still referring to FIG. 2, the network 114 may serve as a means for communicating information across the various systems and entities of the electronic transaction routing system and environment. For example, in some embodiments, the network may facilitate the transmission of payment transaction information as well as identifying information of the merchant, terminal, and payment network used, to the transaction routing server via the cloud, e.g., the Internet, or any type of wired or wireless wide area network. Network 114 may facilitate the periodic or continual updating of the transaction routing server 116 on payment network interchange rates from various computing systems, as well as the markup rates for various acquirers from the computing systems of the respective acquirer institutions.

Still referring to FIG. 2, transaction routing server 116 may be a computing system comprising at least one processor 118 and at least one data storage device, e.g., database 120. In some embodiments, the transaction routing server 116 may receive information from the merchant 106 and/or terminals 110A-C, maintain a database 120 of stored information related to acquirer processors, payment networks, issuers, regulatory status, rate qualification criteria, etc., periodically or continually update its database 120, and transmit information back to merchant 106 and/or terminals 110A-C. Database 120 may further include a dataset of processing results that may be used to determine a likelihood of authorization or conversion for subsequent transaction requests. Upon the initiation of a payment transaction at a terminal 110A-C, the transaction routing server 116 may receive various transaction related information, which may include, but is not limited to, a BIN, identifications of available payment networks useable in the transaction ("payment network IDs"), merchant categories, regulatory status, transaction amount, "preferred" or "premier" status, etc. In some embodiments, the payment network identification may include a payment card number, whose first six digits may identify an issuer and/or bank institution that is associated with a payment network.

Still referring to FIG. 2, upon receiving the transaction-related information, the transaction routing server 116 may use the extracted payment network identification to determine which payment networks a transaction may be used (e.g., payment network 1 122A, payment network 2 122B, payment network 3 122C). Depending on the payment networks available, transaction routing server 116 may subsequently use that payment network's rate qualification criteria 124A-124C to determine the standard rates 126A-126C vs. preferred rates 128A-128C for the transaction. In some embodiments, transaction routing server 116 may also use the rate qualification criteria 124A-124C to determine information about the relevant issuer, such as a regulatory status 132A 132C. In some embodiments, the regulatory status is determined by the identity of the issuer (e.g., more or less than $10B in assets), whereas the standard vs. preferred rate is determined by the payment network.

In addition, the transaction routing server 116 may process the dataset of processing results to determine success factors related to a likelihood of authorization or conversion for subsequent transaction requests. The success factors may be based on a status of a financial account associated with the transaction or cardholder, or other factors, such as, for example, the presence or absence of a billing address, the presence or absence of a card verification value (CVV), the presence or absence of a payment vehicle expiration date, the presence or absence of a payment vehicle issuer token, a merchant classification code (MCC), etc. Generating the factor success data may include applying data science methods, machine learning, or other suitable methods to the dataset of processing results. The generated factor success data may be specific to each payment network 122 such that transaction routing server 116 may compare the likelihood of authorization across multiple networks.

Furthermore, the transaction routing server 116 may use information related to acquirer processors stored in database 120 to determine which acquirer processors may be used to process the transaction (e.g., acquirer processor 1 170A, acquirer processor 2 170B, acquirer processor 3 170C, etc.). Transaction routing server 116 may use information related to each eligible acquirer processer to determine factors that may affect the processing costs of a transaction submitted to each eligible acquirer processer including, for example, debit network eligibility/availability, PIN-less authorization approval likelihood, authorization approval lift, cost of acquisition, and cost of processing (i.e., core processing fees), etc.

Thus, transaction routing server 116 is configured to evaluate and select, from one of many networks (e.g., Payment Network 1 122A, Payment Network 2 122B, . . . Payment Network N 122C, etc.) and one of many acquirer processors may be used to process the transaction (e.g., acquirer processor 1 170A, acquirer processor 2 170B, acquirer processor 3 170C, etc.), a combination of acquirer processor and payment network that may yield the least cost markup rate for a given transaction. In some embodiments, this selection may include comparing the markup rates within various pricing models for each of the acquirers, selecting the pricing model yielding the lowest markup rate, for each of the acquirers, identifying networks with the lowest rates for a given standard vs. preferred status, and a given regulatory exemption status, and then selecting the lowest interchange, "acceptance," and/or "markup" rate among all of the networks.

In addition, transaction routing server 116 may determine the likelihood that a transaction will be declined by each payment network. The additional costs of a declined transaction, including for example, additional fees for re-submitting the declined transaction, may also be included in the determination of the least cost network among the many networks (e.g., Payment Network 1 122A, Payment Network 2 122B, . . . Payment Network N 122C, etc.).

Still referring to FIG. 2, in summary, once transaction routing server 116 receives the transaction-related information from a terminal 110A-C via network 114, the transaction routing server 116 may retrieve, from its database 120, the available rate information based on the rate qualification criteria of the payment networks available to be used in the transaction. For example, if the transaction routing server identifies, based on the issuer ID and/or payment network ID provided in the received transaction-related information that payment network 1 122A is being utilized, transaction routing server 116 may retrieve, from its database 120, a list of eligible or available alternative payment networks, their respective rate qualification criteria, their standard vs. preferred rates, and the issuer's regulatory status as either "exempt" or "regulated." Transaction routing server 116 may, in addition, determine factors related to the acquirer processors that may affect the ultimate processing cost of the transaction. Transaction routing server 116 may also determine the likelihood that a transaction will be declined by each payment network and the additional costs of a declined transaction. Subsequently, transaction routing server 116 may determine, from one of many networks 122A-122C, the network that provides the overall best solution for the merchant, whether or not that network is actually the least costly for any given transaction. In some embodiments, the markup rates for the various networks and merchants may be stored within database 120 of transaction routing server 116. The database 120, including the dataset of processing results, may be continually and/or periodically updated by computing systems or servers representing the one or more issuers 130A-130C.

Still referring to FIG. 2, once transaction routing server 116 determines a matrix of various cost factors and markup rates across acquirer processors, issuers, and networks, as well as a likelihood of acceptance of the transaction and the costs of a declined transaction across issuers and networks, transaction routing server 116 may determine the total rate that would be incurred by the merchant for the transaction. Typically, the markup rate and/or the acceptance rate may be determined to be one or more of a percentage of the transaction amount, a flat charge, or a value amount added to a percentage of the transaction amount. The likelihood of acceptance may be based on a status of a financial account associated with the transaction or cardholder, or other factors, such as, for example, the presence or absence of a billing address, the presence or absence of a card verification value (CVV), the presence or absence of a payment vehicle expiration date, the presence or absence of a payment vehicle issuer token, a merchant classification code (MCC), etc. Once the acceptance rate, costs of declined transactions, and the least cost markup rate has been identified (e.g., from the decision-making process depicted in FIGS. 2A and/or 2B), the rates may be combined and/or may be sent along with the transaction-related information to the selected combination of acquirer processor, issuer, and network with the least cost markup rate for further processing of the payment transaction. In some embodiments, the combined rates along with information related to or identifying the selected network may be sent back to the payment terminal of the merchant or a computing system of the merchant. In other embodiments, after the combined rates along with transaction-related information has been sent to the selected network with the least cost rate and the payment transaction has been further processed, the acquirer may send information ("transaction processing acknowledgment information") acknowledging the processing of the transaction back to transaction routing server 116. In such embodiments, transaction routing server 116 may communicate the transaction processing acknowledgment information to merchant 106 and/or payment terminal 110A-110C of the merchant.

Since the various payment terminals and servers associated with the plurality of merchants, acquirers, acquirer processors, and/or payment networks, with which the marketplace transmits and/or receives information, may use different messaging formats, it is envisioned that in various embodiments of the present disclosure, the transaction routing server 116 has the ability to translate between and/or support platforms of various messaging formats. For example, if a payment terminal communicates transaction related information in JSON but acquirer 1 communicates information regarding the transaction in XML, the transaction routing server may receive the information regarding the transaction from acquirer 1 in XML, translate the information to JSON, and deliver the information to the payment terminal in JSON. In some embodiments, the task of translating messages of various formats into a format readable by the recipient device (e.g., terminal) may be performed by processor 118 of transaction routing server 116.

Figure 3A:
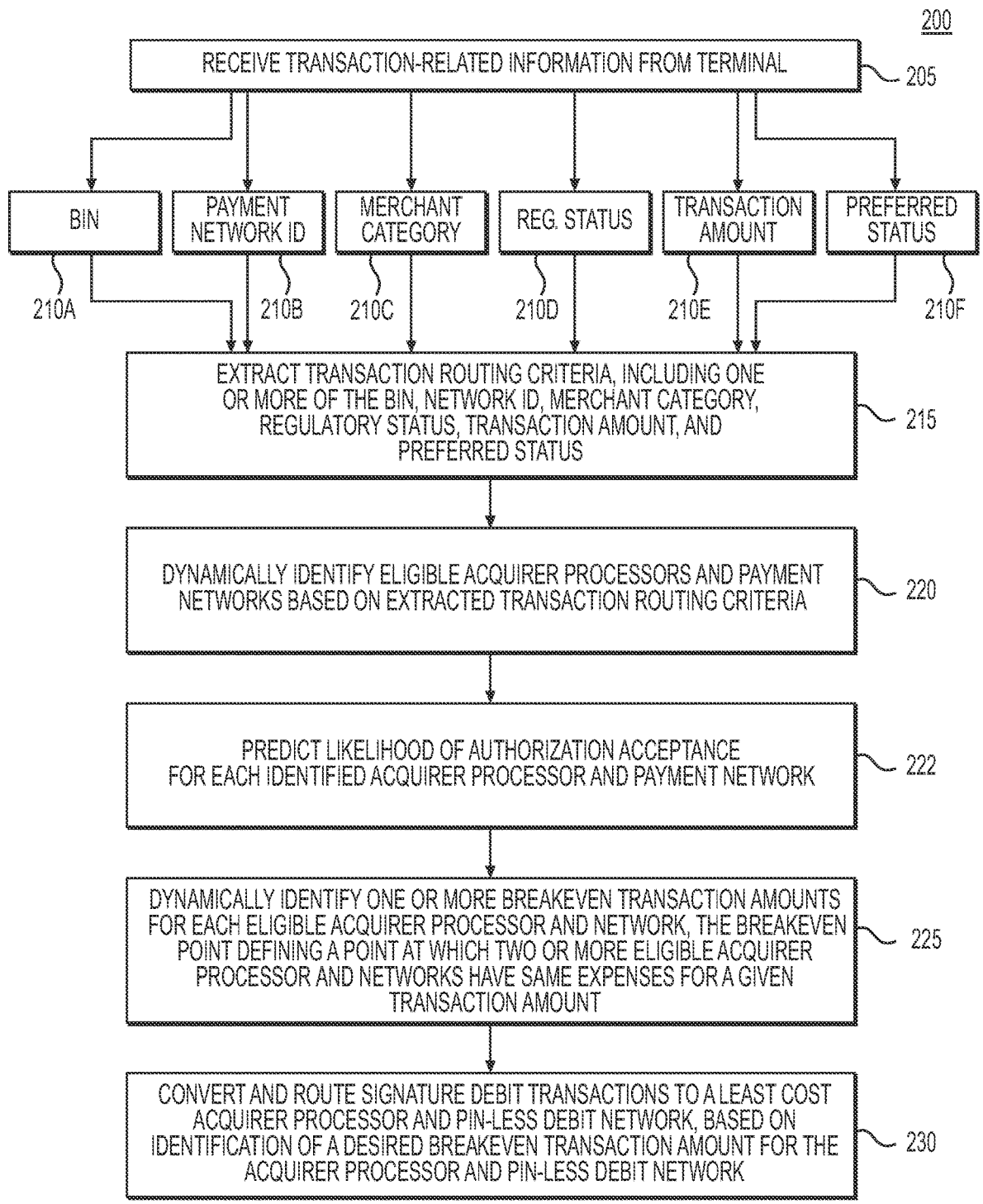
FIG. 3A depicts a flow diagram of an exemplary method executed by a transaction routing server for optimized routing of electronic transactions across multiple acquirer processors, in accordance with non-limiting embodiments.

FIG. 3A depicts a flow diagram of an exemplary method executed by a transaction routing server for routing electronic payment transactions to PIN-less debit networks based on dynamic routing, in accordance with non-limiting embodiments. Specifically, FIG. 3A depicts a method of routing a transaction over a PIN-debit network even if a PIN is not present, by leveraging a relationship with the issuer. Such techniques may be performed by adding "signature transactions" as separate networks in the sequencing of available networks and pseudo-networks. For example, a decision may be made on whether to send a given transaction through credit networks or through PIN debit rails.

Specifically, FIG. 3A depicts a method 200 for routing electronic payment transactions to PIN-less networks using payment pseudo-networks and electronic transaction simulation. In one embodiment, method 200 includes step 205, which may include receiving transaction-related information from a terminal. As illustrated in steps 210A-210F, the transaction-related information may include an issuing or "issuer" bank identification number ("BIN") 210A, an identification of the available payment networks ("payment network IDs") 210B, an identification of one or more merchant categories 210C, an identification of a regulatory status of the issuer (issuing bank) 210D, the transaction amount charged or to be charged 210E, and a preferred (or non-preferred) status 210F associated with the merchant affiliated with the transaction. In some embodiments, for example in transactions involving e-commerce, or an online purchase, the transaction-related information need not include a terminal ID, e.g., where a physical terminal does not exist. The modes and/or forms of payment may include, but are not limited to, the type of card presented, the specific information contained in the transaction, how and when a payment transaction is processed, the industry of the merchant, whether additional services (e.g., address verification service (AVS)) are utilized, etc.

Step 215 may include extracting routing criteria from the transaction-related information, including but not limited to the BIN 210A, available payment network IDs 210B, merchant categories 210C, issuer regulatory status 210D, transaction amount 210E, and preferred status 210F. In some embodiments, a default or initial payment network may be identified from the first digit of the payment card number and/or a bank card number (e.g., Visa, MasterCard, Discover, American Express, JCB, etc., for credit networks, and/or Star, Plus, Genie, Cirrus, etc., for debit networks).

Step 220 may include dynamically identifying eligible acquirer processors and networks based on extracted transaction routing criteria. For example, step 220 may include identifying eligible acquirer processors and networks based on the identity of the cardholder's issuing bank and/or the identity and/or category of the relevant merchant corresponding to the transaction.

Step 222 may include predicting a likelihood of authorization acceptance for each identified acquirer processor and network. For example, step 222 may include comparing one or more parameters of the payment transaction to the factor success data. Such comparison may include applying factor weights from the factor success data to the parameters of the transaction. Such factor weights may be determined by any suitable method, including, for example, statistical methods including regression analysis, machine learning, artificial intelligence methods such as neural networks, etc.

Step 225 may include dynamically identifying one or more breakeven transaction amounts for each eligible acquirer processors and network. In some embodiments, the breakeven point may define a point at which two or more combinations of eligible acquirer processors and networks have the same expenses for a given transaction, the expenses including costs associated with a low predicted likelihood of authorization acceptance.

Step 230 may include routing signature debit transactions to a least cost acquirer processor and PIN-less network. In some embodiments, signature debit transactions may be converted and routed to a least cost PIN-less network based on identification of a desired breakeven transaction amount for the PIN-less debit network. For example, in one embodiment, step 230 may involve routing signature debit transaction to PIN-less networks by leveraging a processor's relationship with a given network, or between a merchant and a network. Specifically, eligible transactions may be determined based on BIN and organization ID. For example, a particular BIN may be used for PIN-less network eligibility (accounting for large percentages of total network volume), and organization ID ("Org ID") may be used to set thresholds for eligibility, such as a minimum of $X MM in annual sales and a maximum of 0.x % chargeback rate. Such chargeback rate thresholding may be used as a proxy for e-commerce eligibility and/or risk profile analysis. In another embodiment, step 255 may involve "PIN prompting," which reduces acceptance costs by shifting signature transactions to PIN debit transactions, and seamlessly routing signature debit transactions to least-cost PIN-less debit networks.

Figure 3B:
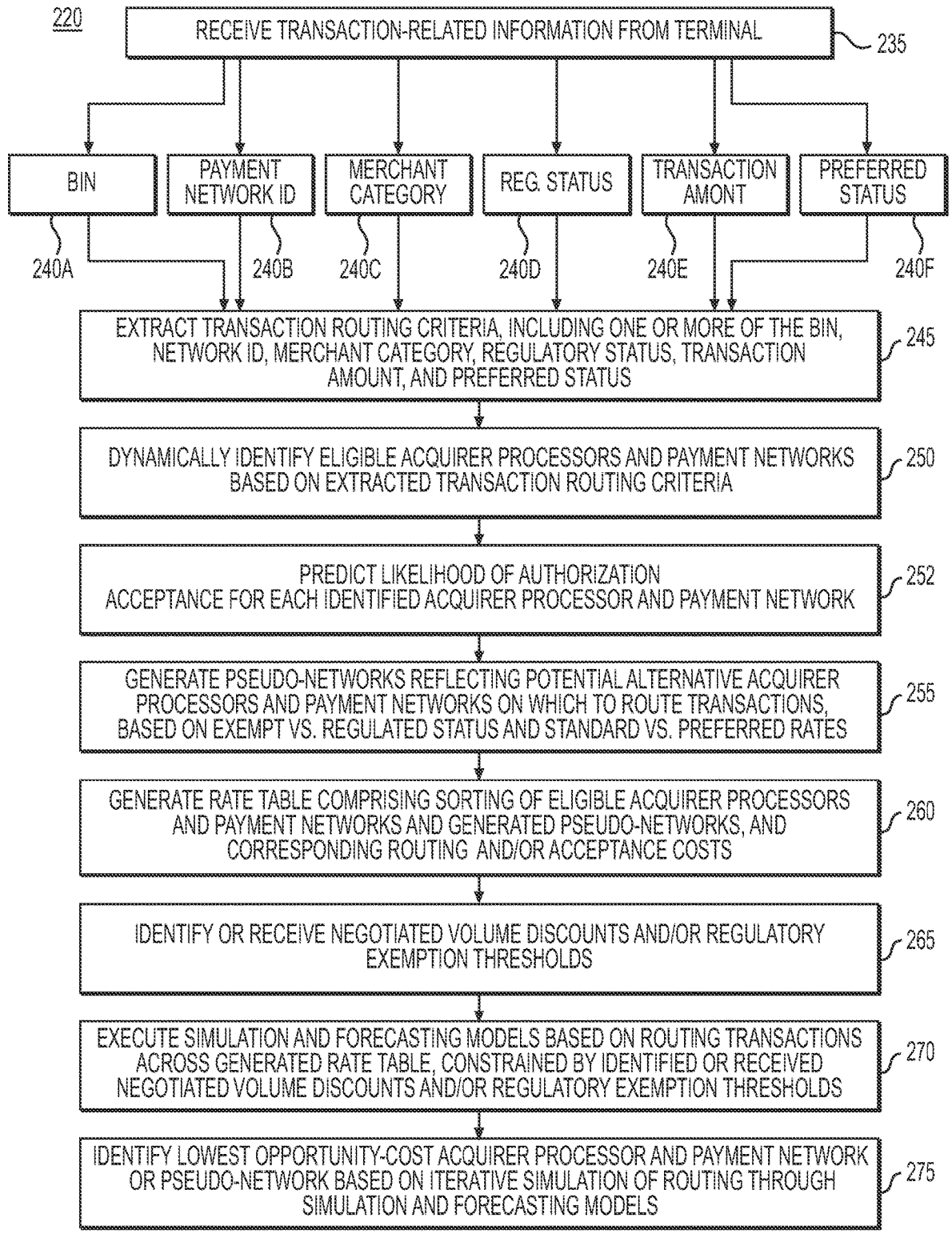
FIG. 3B depicts a flow diagram of an exemplary method executed by a transaction routing server for optimized routing of electronic transactions across multiple acquirer processors, in accordance with non-limiting embodiments.

FIG. 3B depicts a flow diagram of an exemplary method executed by a transaction routing server for routing electronic payment transactions using payment pseudo-networks and electronic transaction simulation and forecasting, in accordance with non-limiting embodiments. Specifically, FIG. 3B depicts a method 220 for routing electronic payment transactions using payment pseudo-networks and electronic transaction simulation, forecasting, and iteration. In one embodiment, method 220 includes step 235, which may include receiving transaction-related information from a terminal. As illustrated in steps 240A-240F, the transaction-related information may include an issuing or "issuer" bank identification number ("BIN") 240A, an identification of the available payment networks ("payment network IDs") 240B, an identification of one or more merchant categories 240C, an identification of a regulatory status of the issuer (issuing bank) 240D, the transaction amount charged or to be charged 240E, and a preferred (or non-preferred) status 240F associated with the merchant affiliated with the transaction. In some embodiments, for example in transactions involving e-commerce, or an online purchase, the transaction-related information need not include a terminal ID, e.g., where a physical terminal does not exist. The modes and/or forms of payment may include, but are not limited to, the type of card presented, the specific information contained in the transaction, how and when a payment transaction is processed, the industry of the merchant, whether additional services (e.g., address verification service (AVS)) are utilized, etc.

Step 245 may include extracting routing criteria from the transaction-related information, including but not limited to the BIN 240A, available payment network IDs 240B, merchant categories 240C, issuer regulatory status 240D, transaction amount 240E, and preferred status 240F. In some embodiments, a default or initial payment network may be identified from the first digit of the payment card number and/or a bank card number (e.g., Visa, MasterCard, Discover, American Express, JCB, etc., for credit networks, and/or Star, Plus, Genie, Cirrus, etc., for debit networks).

Step 250 may include dynamically identifying eligible acquirer processors and networks based on extracted transaction routing criteria. For example, step 220 may include identifying eligible acquirer processors and networks based on the identity of the cardholder's issuing bank and/or the identity and/or category of the relevant merchant corresponding to the transaction.

Step 252 may include predicting a likelihood of authorization acceptance for each identified acquirer processor and network. For example, step 252 may include comparing one or more parameters of the payment transaction to the factor success data. Such comparison may include applying factor weights from the factor success data to the parameters of the transaction. Such factor weights may be determined by any suitable method, including, for example, statistical methods including regression analysis, machine learning, artificial intelligence methods such as neural networks, etc.

Step 255 may include generating pseudo-networks reflecting potential alternative acquirer processors and networks on which to route transaction. In some embodiments, pseudo-networks may be generated based on exempt vs. regulated status and standard vs. preferred rates.

Step 260 may include generating one or more rate tables comprising a sorting of eligible acquirer processors and networks and generated pseudo-networks, and corresponding routing and/or acceptance costs, the acceptance costs including costs associated with a low predicted likelihood of authorization acceptance.

Step 265 may include identifying or receiving negotiated volume discounts and/or regulatory exemption thresholds. For example, in some cases, merchants, processors, and/or networks may negotiate preferred rates and/or volume discounts for given transaction amounts or transaction volumes. Thus, step 265 may comprise receiving information about negotiated volume discounts and/or regulatory exemption thresholds.

Step 270 may include executing simulation and forecasting models based on routing transactions across the one or more generated rate tables, constrained by the identified or received negotiated volume discounts and/or regulatory exemption thresholds. Step 275 may include identifying a lowest opportunity-cost combination of acquirer processor and network or pseudo-network based on iterative simulation of routing through the simulation and forecasting models.

For example, as will be discussed with respect to FIG. 4 below, one or more of an iterative algorithm 408, simulation module 404, and forecasting module 406 may be configured to interact to accurately forecast the absolute dollar amount of routing, and minimize the opportunity cost of pulling transactions from one network and routing them through another alternative network (e.g., a created pseudo-network), so as to reach negotiated volume discounts, comply with regulatory rules, leverage preferred rates, and reach other important technical and business goals. As an example, it may be the case that a given merchant falls short of a negotiated volume rate by $1M. In such a case, it may be worth sending additional transactions to that network in a non-least-cost manner, just in order to get that volume discount.

Figure 4:
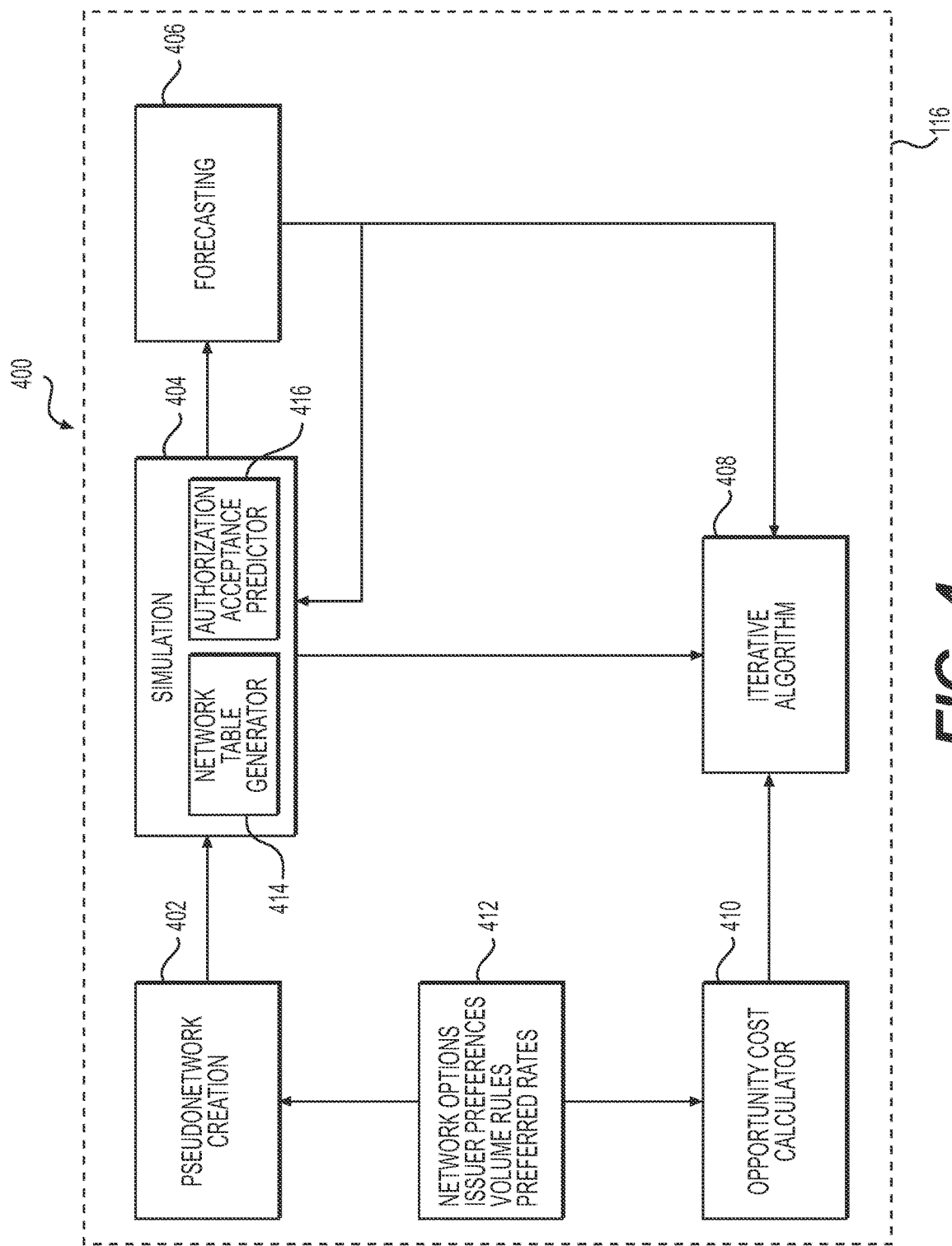
FIG. 4 depicts a plurality of modules and/or sub-systems of the transaction routing server of FIGS. 1 and 2, for optimized routing of electronic transactions across multiple acquirer processors, in accordance with non-limiting embodiments.

FIG. 4 depicts a schematic diagram 400 of a plurality of modules and/or sub-systems of the transaction routing server 116 of FIG. 2, for routing electronic payment transactions to PIN-less debit networks and dynamically routing electronic payment transactions using payment pseudo-networks and electronic transaction simulation, in accordance with non-limiting embodiments. Specifically, transaction routing server 116 may include a pseudo-network creation module 402, a simulation module 404, a forecasting module 406, an iterative algorithm module 408, an opportunity cost calculator 410, and a parameter/threshold source 412 for obtaining and disseminating, e.g., network options, issuer preferences, volume rules/agreements, preferred rates, regulatory rules, etc. Simulation module 404 may include network table generator 414 and authorization acceptance predictor 416. As shown in FIG. 4, at a high level, parameter/threshold source 412 may obtain and disseminate parameters and thresholds, e.g., network options, issuer preferences, volume rules/agreements, preferred rates, regulatory rules, etc. to the pseudo-network creation module 402 and the opportunity cost calculator 410. Results of simulation module 404 may be fed into forecasting module 406 and iterative algorithm 408. Results of forecasting module 406 may be fed into iterative algorithm 408 and back into simulation module 404.

In one embodiment, pseudo-network creation module 402 may be configured to identify and generate new pseudo-networks to be included in rate tables and compared to existing payment networks in a dynamic routing algorithm. In one embodiment, pseudo-network creation module 402 may account for "standard" vs. "preferred" and card type, which enables creation of a full and realistic table of the available rates. Moreover, pseudo-network creation module 402 may incorporate each of: signature debit networks, PIN debit networks, PIN-less debit networks, and credit networks (including chip-credit networks).

In one embodiment, simulation module 404 and forecasting module 406 may interact to simulate transaction routing over a period of time, such as over a day, week, month, quarter, year, and so on. Thus, network table generator 414 may be configured to implement and analyze the generated tables of networks and pseudo-networks in combination with available acquirer processors, and determine what total dollar value thresholds are achieved, and so on. Authorization acceptance predictor 416 may process the dataset of processing results to determine success factors related to a likelihood of authorization or conversion for subsequent transaction requests. Generating the factor success data may include applying data science methods, machine learning, or other suitable methods to the dataset of processing results. Forecasting module 406 may thereby predict year-over-year growth, and predict other targets, thresholds, and metrics over time, using results of simulation module 404.

Iterative algorithm 408 may be configured to receive inputs from simulation module 404 and forecasting module 406, as well as opportunity cost calculator 410 to determine which transaction to run in a non-least-cost manner that will ultimately achieve better long-term goals. For example, one or more of iterative algorithm 408, simulation module 404, and forecasting module 406 may be configured to interact to accurately forecast the absolute dollar amount of routing, and minimize the opportunity cost of pulling transactions from one network and routing them through another alternative network (e.g., a created pseudo-network), so as to reach negotiated volume discounts, comply with regulatory rules, leverage preferred rates, and reach other important technical and business goals. As an example, it may be the case that a given merchant falls short of a negotiated volume rate by $1M. In such a case, it may be worth sending additional transactions to that network in a non-least-cost manner, just in order to get that volume discount. Iterative algorithm 408, simulation module 404, and forecasting module 406 may be configured to determine which merchant's transactions and/or which other network's transactions to route in order to achieve the desired volume discount.

Figure 5:
FIG. 5A depicts a table of payment networks including created pseudo-networks, in accordance with non-limiting embodiments.
FIG. 5B depicts a table of payment networks including created pseudo-networks, sorted according to a simulated forecast of transaction volume and rates, in accordance with non-limiting embodiments.

FIG. 5A depicts a table of payment networks including created pseudo-networks, in accordance with non-limiting embodiments.

FIG. 5B depicts a table of payment networks including created pseudo-networks, sorted according to a simulated forecast of transaction volume and rates, in accordance with non-limiting embodiments.

Figure 6:
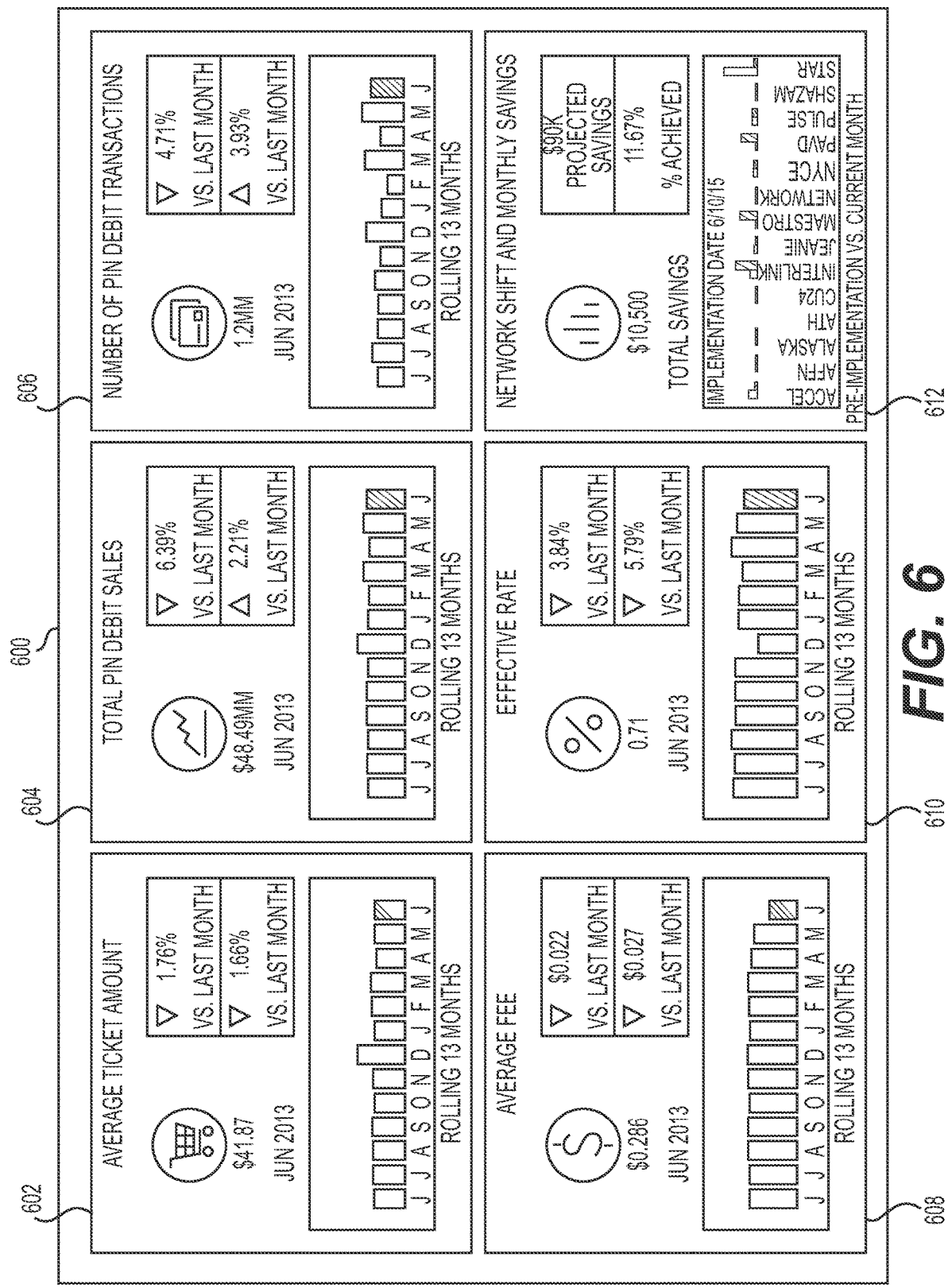
FIG. 6 depicts a screenshot of an exemplary user interface for displaying results of optimized routing of electronic transactions across multiple acquirer processors.

FIG. 6 depicts a screenshot of an exemplary user interface for displaying results of routing electronic payment transactions using payment pseudo-networks and electronic transaction simulation, and transaction forecasting and iteration.

Figure 7:
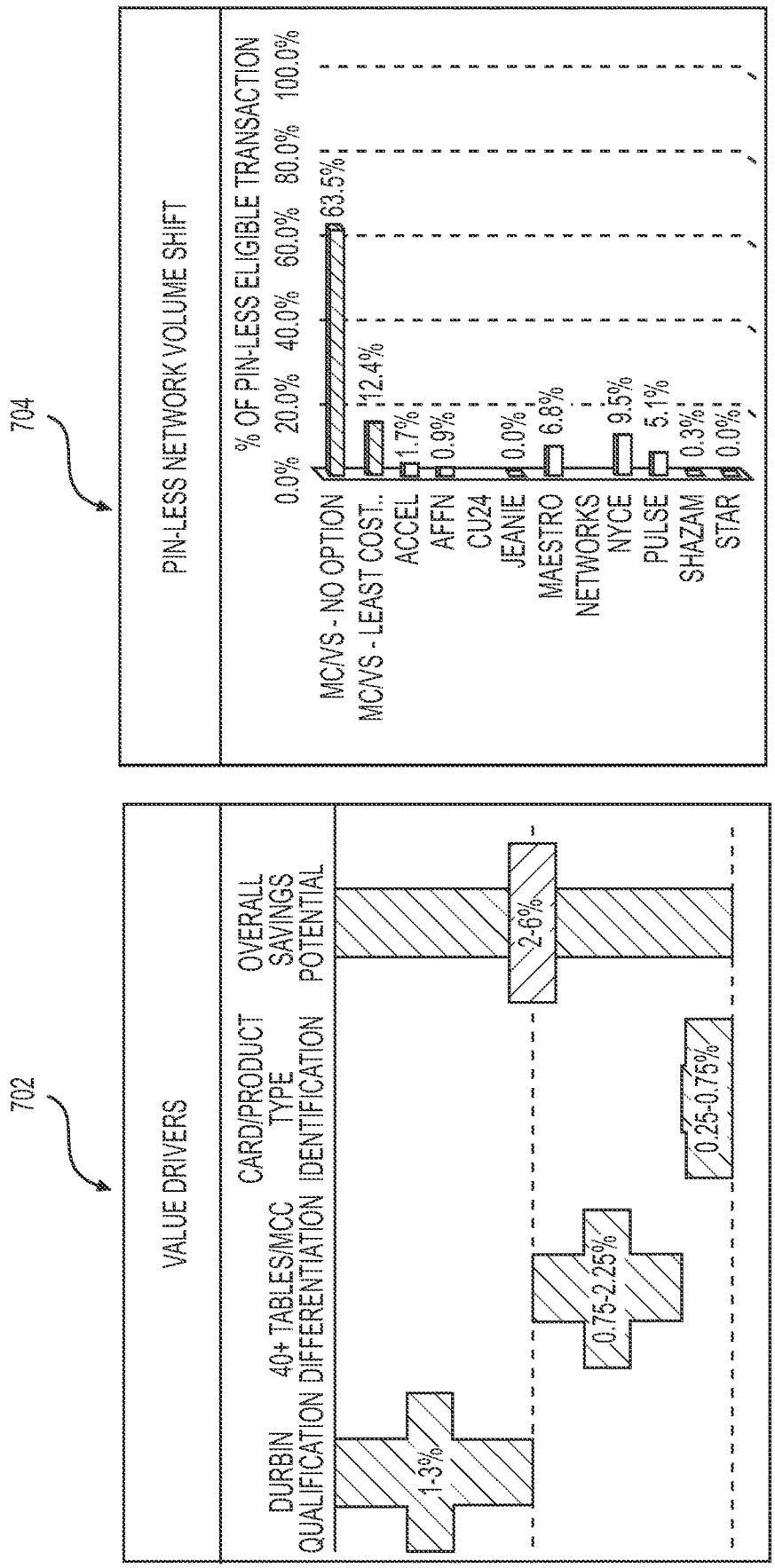
FIGS. 7A and 7B depict a report of an anonymized PIN-less debit system including a report of value drivers of savings (FIG. 7A) and a report of PIN-less network volume shift (FIG. 7B).

FIGS. 7A and 7B depict a report of anonymized PIN-less debit system including a report 702 of value drivers of savings (FIG. 7A) and a report 704 of PIN-less network volume shift (FIG. 7B). Specifically, FIG. 7A depicts a graphical report 702 of value drivers of savings including, for example, regulatory (e.g., Durbin) qualification, 40+ tables/MCC differentiation, card/product type identification, and overall savings potential. FIG. 7B depicts a graphical report 704 reflecting a representation of PIN-less network volume shift by percent (%) of PIN-less eligible transactions across various networks, including "no option" MasterCard-Nisa ("MCNS"), "least cost" MasterCardNisa ("MCNS"), Accel, Jeanie, Maestro, Star, and so on. The graphical reports of FIGS. 7A and 7B reflect that, given at least one sample transaction, as many as 99.94% of all signature debit transactions could satisfy current PIN-less eligibility requirements. Moreover, assuming least cost priority 24.3% of eligible signature debit transactions converted PIN-less debit assuming certain PIN-less pricing.

Figure 8:
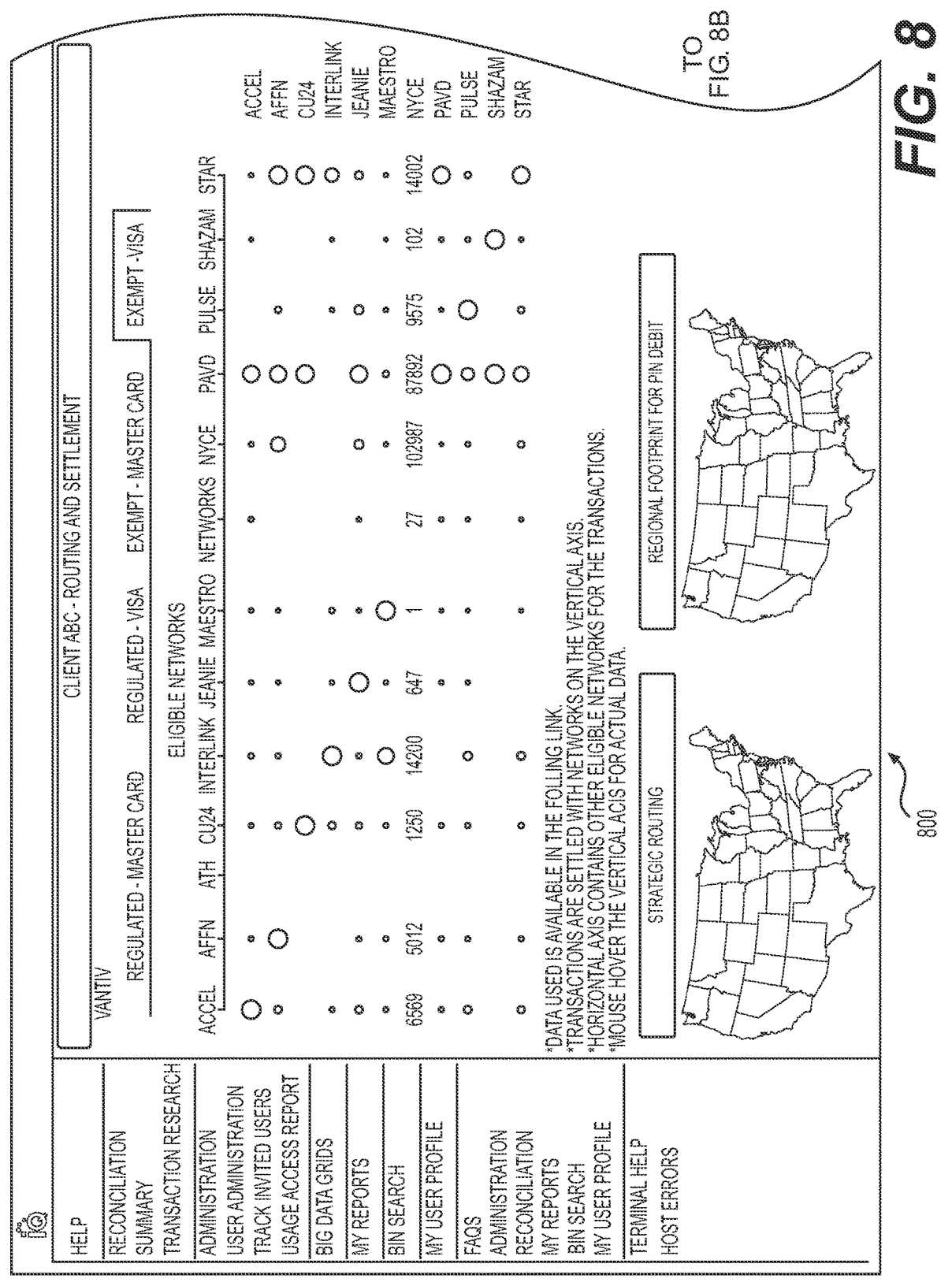

FIGS. 8A and 8B are screenshots of an exemplary graphical user interface (GUI) depicting routing and settlement for an exemplary merchant, including a display of regulated vs. exempt issuer transactions and a distribution of transactions across eligible networks for the given transaction criteria.

Figure 9:
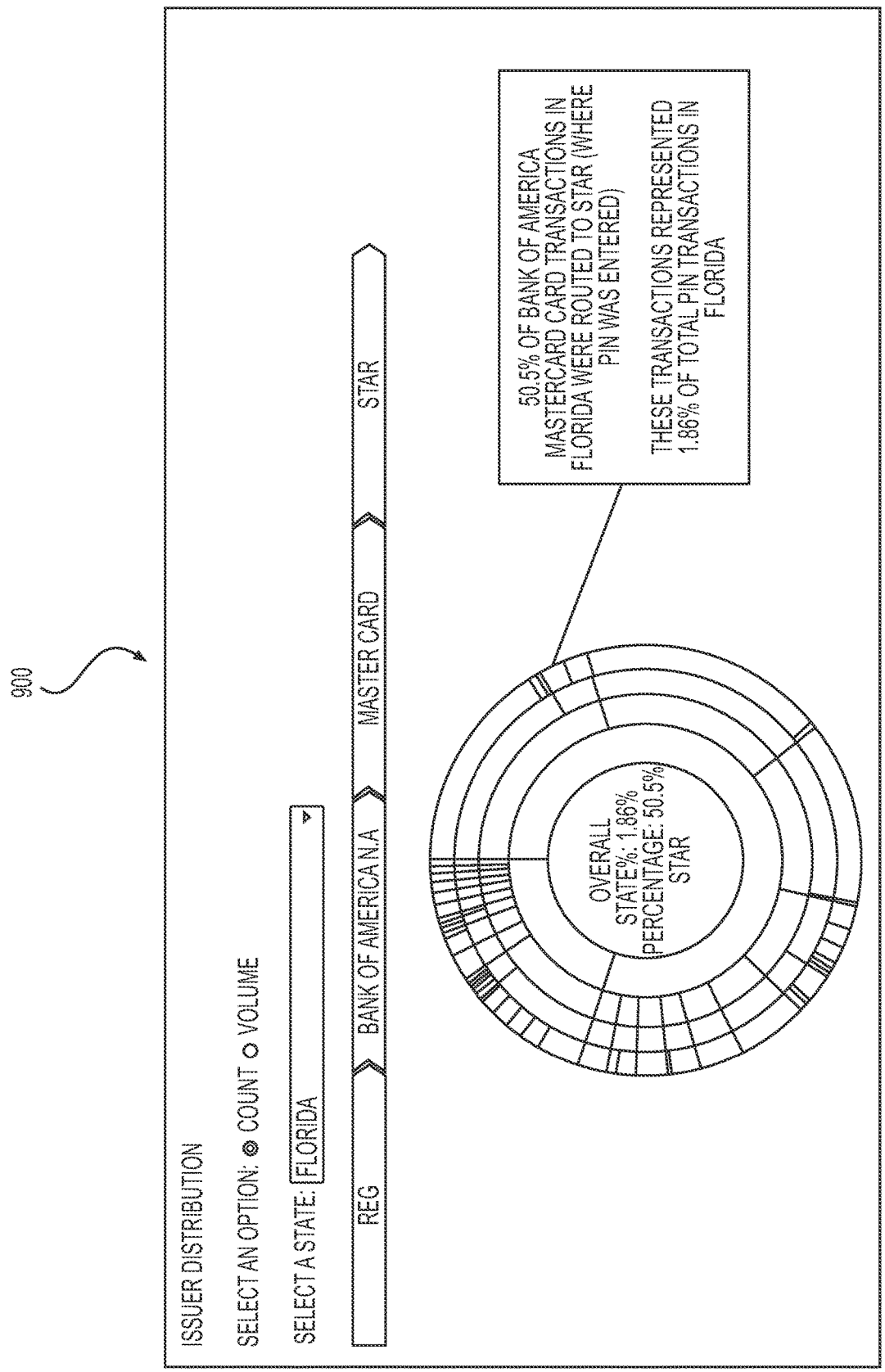
FIG. 9 is a screenshot of an exemplary graphical user interface (GUI) depicting an exemplary issuer distribution of issuer, brand, and network detail, with selective user elements enabling sorting.

FIG. 9 is a screenshot of an exemplary graphical user interface (GUI) depicting an exemplary "issuer distribution," e.g., of issuer, brand, and network detail, with selective user elements enabling sorting by count, volume, state, issuer, network, etc. As shown in FIG. 9, in one embodiment, it a circular graphical display may depict the relevant distributions by both state and percentage within a given issuer. FIG. 9 shows that, in this case, e.g., 50.5% of Bank of America MasterCard transactions in Florida were routed to Star (where the PIN was entered), and that these transactions represented 1.86% of total pin transactions in Florida. This type of interactive visualization may enable merchants (clients of the routing server system) to drill-down into debit volume by state, regulated status, issuer, brand, PIN debit network, and so on.

Figure 10:
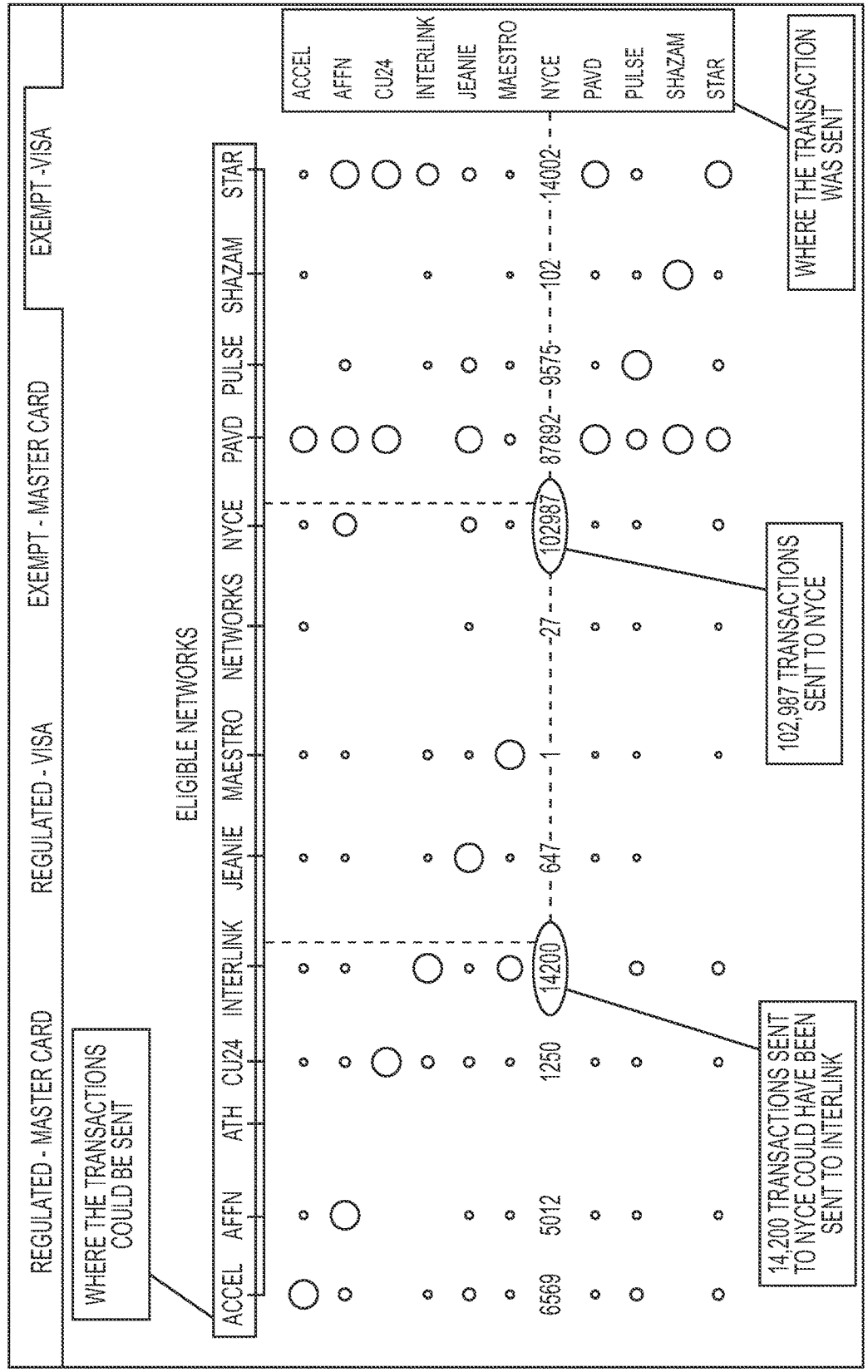
FIG. 10 is a screenshot of an exemplary graphical user interface (GUI) depicting an exemplary interface for reviewing and selecting an alternate network eligibility.

FIG. 10 is a screenshot of an exemplary graphical user interface (GUI) depicting an exemplary interface for reviewing and selecting an alternate network eligibility. Specifically, the visualization of FIG. 10 enables a merchant (client of the routing server system) to better understand a maximum volume opportunity for a given PIN debit network. As shown in FIG. 10, transactions are settled with the networks on the vertical axis, whereas the horizontal axis contains other eligible networks for the transactions. In particular, as shown in FIG. 10, in one embodiment, the disclosed interface may comprise different tabs for regulated vs. exempt issuers or networks. Each tab may comprise column headers indicating eligible networks of where transactions could be sent, row headers indicating eligible networks where the transactions were actually sent, and intersecting bubbles having sizes indicating numbers of transactions sent to one network that could have been sent to another network, at a savings. Moreover, in one embodiment, mousing over, hovering over, or touch-tapping the vertical axis, the indicated bubbles, or other locations, may expose raw and/or formatted data.

These and other embodiments of the systems and methods may be used as would be recognized by those skilled in the art. The above descriptions of various systems and methods are intended to illustrate specific examples and describe certain ways of making and using the systems disclosed and described here. These descriptions are neither intended to be nor should be taken as an exhaustive list of the possible ways in which these systems can be made and used. A number of modifications, including substitutions of systems between or among examples and variations among combinations can be made. Those modifications and variations should be apparent to those ordinarily skilled in this area after having read this disclosure.

It is intended that the specification and examples be considered as exemplary only, with a true scope and spirit of the invention being indicated by the following claims. Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for routing electronic payment transactions to payment networks using electronic transaction simulation, the method comprising:

predicting a likelihood of authorization acceptance of a transaction for each network-processor combination among a plurality of eligible network-processor combinations of an eligible payment network for the transaction and an eligible acquirer processor for the transaction based on a dataset of processing results;

for each network-processor combination among the plurality of eligible network-processor combinations, dynamically determining a breakeven transaction amount with respect to each other network-processor combination among the plurality of eligible network-processor combinations, the breakeven transaction amount being defined as a hypothetical transaction amount at which the network-processor combination and the other network-processor combination have equal expenses for the hypothetical transaction amount, the expenses including costs associated with a failure to obtain authorization acceptance;

determining a least cost network-processor combination among the plurality of eligible network-processor combinations based on identification of a breakeven transaction amount for the network-processor combination;

updating a transaction routing table according to the determined least cost network-processor combination;

routing transactions from a merchant to network-processor combinations according to the updated transaction routing table;

updating the dataset of processing results based on processing results of the transactions;

determining, based on the updated dataset of processing results and the determined least cost combination of acquirer processor and PIN-less debit network, a number of transactions routed to each network-processor combination for which a different network-processor combination had a lower cost; and providing a user interface including user interface elements for each pair of a first network-processor combination and a second network-processor combination, wherein a size of each user interface element indicates a volume of transactions routed to the first network-processor combination for which the second network-processor combination had a lower cost.

2. The computer-implemented method of claim 1, wherein the transaction includes transaction related information including one or more of:
a bank identification number ("BIN");
one or more available payment network IDs;
one or more merchant categories;
a transaction amount;
a primary account number;
an issuer identification number;
a payment card number;
a mode of payment including a swiping of a card, keying in an identification related to the payment network, a contactless mode of payment, or a mode of payment that utilizes a chip; and
whether an address verification system was utilized, and wherein transaction routing criteria is extracted from the transaction-related information.

3. The computer-implemented method of claim 1, further comprising:
identifying one or more pseudo-networks corresponding to one or more of the eligible networks, each pseudo-network comprising a modification of a network to account for a change in regulatory exemption status or a change in preferred status.

4. The computer-implemented method of claim 1, further comprising:
dynamically sorting each network-processor combination according to breakeven transaction amounts, absolute cost, availability of volume discount, and availability of preferred rates.

5. The computer-implemented method of claim 1, further comprising:
receiving an identification of a regulatory threshold or negotiated volume threshold;
identifying one or more pseudo-networks corresponding to one or more of the eligible networks, each pseudo-network comprising a modification of a network to account for a change in regulatory exemption status or a change in preferred status;
dynamically identifying a plurality of pseudo-network-processor combinations of a pseudo-network among the one or more pseudo-networks and an eligible acquirer processor among the one or more eligible acquirer processors;
for each pseudo-network-processor combination among the plurality of pseudo-network-processor combinations, dynamically determining a breakeven transaction amount with respect to each other pseudo-network-processor combination among the plurality of pseudo-network-processor combinations, the breakeven transaction amounts being defined as a hypothetical transaction amount at which the pseudo-network-processor combination and the other pseudo-network-processor combination have equal expenses for the hypothetical transaction amount; and
dynamically sorting the combination of eligible acquirer processors and eligible networks and pseudo-networks to identify a least-cost network.

6. The computer-implemented method of claim 1, further comprising:
generating a display of routing and settlement across combinations of eligible acquirer processors and eligible networks, and user-configurable displays of regulated vs. exempt issuers.

7. The computer-implemented method of claim 1, further comprising:
generating, for a merchant, a display of first grouping of combinations of acquirer processors and networks to which a set of transactions were routed relative to a second grouping of combinations of acquirer processors and networks to which the set of transactions could have been routed, for an overall cost savings to the merchant.

8. The computer-implemented method of claim 7, further comprising:
generating a plurality of user elements enabling a merchant user to reveal a group of transaction routing decisions according to issuer, regulatory exemption status, and preference or preferred rate status.

9. A system for routing electronic payment transactions to payment networks using electronic transaction simulation, the system comprising:
a data storage device storing instructions for routing electronic payment transactions to payment networks using electronic transaction simulation in an electronic storage medium; and
a processor configured to execute the instructions to perform a method including:
predicting a likelihood of authorization acceptance of a transaction for each network-processor combination among a plurality of eligible network-processor combinations of an eligible payment network for the transaction and an eligible acquirer processor for the transaction based on a dataset of processing results;
for each network-processor combination among the plurality of eligible network-processor combinations, dynamically determining a breakeven transaction amount with respect to each other network-processor combination among the plurality of eligible network-processor combinations, the breakeven transaction amount being defined as a hypothetical transaction amount at which the network-processor combination and the other network-processor combination have equal expenses for the hypothetical transaction amount, the expenses including and costs associated with a failure to obtain authorization acceptance;
determining a least cost network-processor combination among the plurality of eligible network-processor combinations based on identification of a breakeven transaction amount for the network-processor combination;
updating a transaction routing table according to the determined least cost network-processor combination;
routing transactions from a merchant to network-processor combinations according to the updated transaction routing table;
updating the dataset of processing results based on processing results of the transactions;
determining, based on the updated dataset of processing results and the determined least cost combination of acquirer processor and PIN-less debit network, a number of transactions routed to each network-processor combination for which a different network-processor combination had a lower cost; and
providing a user interface including user interface elements for each pair of a first network-processor combination and a second network-processor combination, wherein a size of each user interface element indicates a volume of transactions routed to the first network-processor combination for which the second network-processor combination had a lower cost.

10. The system of claim 9, wherein the transaction includes transaction related information further including one or more of:
a bank identification number ("BIN");
one or more available payment network IDs;
one or more merchant categories;
a transaction amount;
a primary account number;
an issuer identification number;
a payment card number;
a mode of payment including a swiping of a card, keying in an identification related to the payment network, a contactless mode of payment, or a mode of payment that utilizes a chip; and
whether an address verification system was utilized, and
wherein transaction routing criteria is extracted from the transaction-related information.

11. The system of claim 9, wherein the system is further configured for:
identifying one or more pseudo-networks corresponding to one or more of the eligible networks, each pseudo-network comprising a modification of a network to account for a change in regulatory exemption status or a change in preferred status.

12. The system of claim 9, wherein the system is further configured for:
dynamically sorting each network-processor combination according to breakeven transaction amounts, absolute cost, availability of volume discount, and availability of preferred rates.

13. The system of claim 9, wherein the system is further configured for:
receiving an identification of a regulatory threshold or negotiated volume threshold;
identifying one or more pseudo-networks corresponding to one or more of the eligible networks, each pseudo-network comprising a modification of a network to account for a change in regulatory exemption status or a change in preferred status;
dynamically identifying a plurality of pseudo-network-processor combinations of a pseudo-network among the one or more pseudo-networks and an eligible acquirer processor among the one or more eligible acquirer processors;
for each pseudo-network-processor combination among the plurality of pseudo-network-processor combinations, dynamically determining a breakeven transaction amount with respect to each other pseudo-network-processor combination among the plurality of pseudo-network-processor combinations, the breakeven transaction amounts being defined as a hypothetical transaction amount at which the pseudo-network-processor combination and the other pseudo-network-processor combination have equal expenses for the hypothetical transaction amount; and
dynamically sorting the combination of eligible acquirer processors and eligible networks and pseudo-networks to identify a least-cost network.

14. The system of claim 9, wherein the system is further configured for:
generating a display of routing and settlement across combinations of eligible acquirer processors and eligible networks, and user-configurable displays of regulated vs. exempt issuers.

15. The system of claim 9, wherein the system is further configured for:
generating, for a merchant, a display of first grouping of combinations of acquirer processors and networks to which a set of transactions were routed relative to a second grouping of combinations of acquirer processors and networks to which the set of transactions could have been routed, for an overall cost savings to the merchant.

16. The system of claim 15, wherein the system is further configured for:
generating a plurality of user elements enabling a merchant user to reveal a group of transaction routing decisions according to issuer, regulatory exemption status, and preference or preferred rate status.

17. A non-transitory machine-readable medium storing instructions that, when executed by a computing system, causes the computing system to perform a method for routing electronic payment transactions to payment networks electronic transaction simulation, the method including:
predicting a likelihood of authorization acceptance of a transaction for each network-processor combination among a plurality of eligible network-processor combinations of an eligible payment network for the transaction and an eligible acquirer processor for the transaction based on a dataset of processing results;
for each network-processor combination among the plurality of eligible network-processor combinations, dynamically determining a breakeven transaction amount with respect to each other network-processor combination among the plurality of eligible network-processor combinations, the breakeven transaction amount being defined as a hypothetical transaction amount at which the network-processor combination and the other network-processor combination have equal expenses for the hypothetical transaction amount, the expenses including costs associated with a failure to obtain authorization acceptance;
determining a least cost network-processor combination among the plurality of eligible network-processor combinations based on identification of a breakeven transaction amount for the network-processor combination;
updating a transaction routing table according to the determined least cost network-processor combination;
routing transactions from a merchant to network-processor combinations according to the updated transaction routing table;
updating the dataset of processing results based on processing results of the transactions;
determining, based on the updated dataset of processing results and the determined least cost combination of acquirer processor and PIN-less debit network, a number of transactions routed to each network-processor combination for which a different network-processor combination had a lower cost; and
providing a user interface including user interface elements for each pair of a first network-processor combination and a second network-processor combination, wherein a size of each user interface element indicates a volume of transactions routed to the first network-processor combination for which the second network-processor combination had a lower cost.

18. The non-transitory machine-readable medium of claim 17, the method further comprising: identifying one or more pseudo-networks corresponding to one or more of the eligible networks, each pseudo-network comprising a modification of a network to account for a change in regulatory exemption status or a change in preferred status.

19. The non-transitory machine-readable medium of claim 17, the method further comprising dynamically sorting each network-processor combination of according to breakeven transaction amounts, absolute cost, availability of volume discount, and availability of preferred rates.

20. The non-transitory machine-readable medium of claim 17, the method further comprising:
receiving an identification of a regulatory threshold or negotiated volume threshold;
identifying one or more pseudo-networks corresponding to one or more of the eligible networks, each pseudo-network comprising a modification of a network to account for a change in regulatory exemption status or a change in preferred status;
dynamically identifying a plurality of pseudo-network-processor combinations of a pseudo-network among the one or more pseudo-networks and an eligible acquirer processor among the one or more eligible acquirer processors;
for each pseudo-network-processor combination among the plurality of pseudo-network-processor combinations, dynamically determining a breakeven transaction amount with respect to each other pseudo-network-processor combination among the plurality of pseudo-network-processor combinations, the breakeven transaction amounts being defined as a hypothetical transaction amount at which the pseudo-network-processor combination and the other pseudo-network-processor combination have equal expenses for the hypothetical transaction amount; and dynamically sorting the combination of eligible acquirer processors and eligible networks and pseudo-networks to identify a least-cost network.

\* \* \* \* \*